United States Patent [19]

Yamamoto et al.

[11] Patent Number: 5,850,303
[45] Date of Patent: Dec. 15, 1998

[54] OPTICAL TRANSMISSION SYSTEM AND OPTICAL TRANSMISSION DEVICE USED THEREFOR

[75] Inventors: Hiroaki Yamamoto, Higashiosaka; Hiroyuki Sasai, Katano; Susumu Morikura, Yawata; Katsuyuki Fujito, Higashiosaka, all of Japan

[73] Assignee: Matsushita Electric Industrial Co., Ltd., Osaka-fu, Japan

[21] Appl. No.: 775,247

[22] Filed: Dec. 30, 1996

[30] Foreign Application Priority Data

| Jun. 14, 1996 | [JP] | Japan | 8-153871 |
|---|---|---|---|
| Sep. 17, 1996 | [JP] | Japan | 8-244388 |

[51] Int. Cl.⁶ .............................. H04J 14/02; H04B 10/04
[52] U.S. Cl. ..................... 359/133; 359/162; 359/173; 359/188; 359/181
[58] Field of Search ................................ 359/115, 124, 359/126, 132–133, 162, 164, 173, 188, 180–181, 184, 183

[56] References Cited

U.S. PATENT DOCUMENTS

| 4,893,300 | 1/1990 | Carlin et al. | 359/132 |
| 5,020,049 | 5/1991 | Bodeep et al. | 359/124 |
| 5,351,148 | 9/1994 | Maeda et al. | 359/124 |
| 5,596,436 | 1/1997 | Sargis et al. | 359/132 |

FOREIGN PATENT DOCUMENTS

| 8-107385 | 4/1986 | Japan . |
| 61-18377 | 5/1986 | Japan . |
| 2-52536 | 2/1990 | Japan . |
| 5-268170 | 10/1993 | Japan . |
| 8-107388 | 4/1996 | Japan . |
| 8-149072 | 6/1996 | Japan . |

OTHER PUBLICATIONS

H. Yamamoto, et al., Proposal of Optical Beat Noise Reduction Technique using Unipolar Amplitude Modulation in Multi–Point Access Optical Network, The Electronic Information Communication Conference, Sep. 18–21, 1996.

*Primary Examiner*—Kinfe-Michael Negash
*Attorney, Agent, or Firm*—Wenderoth, Lind & Ponack, L.L.P.

[57] ABSTRACT

A signal processing circuit 113 subjects a transmission signal outputted from a signal source 111 and a carrier outputted from a carrier generation circuit 112 to predetermined signal processing, to generate a modulation signal amplitude-modulated by the transmission signal and so adapted that its envelop on the high level side (or on the low level side) has a shape analogous to the waveform of the transmission signal and its envelope on the low level side (or on the high level side) is at an approximately constant level. A light source 114 converts the modulation signal into a light intensity modulation signal, and outputs the light intensity modulation signal to an optical coupler 120. The above-mentioned signal processing is performed by the signal processing circuit 113, whereby the spectrum distribution of the light signal outputted from the light source 114 is dispersed, and the peak value of light spectra is decreased. The peak value of beat noise produced after receiving is proportional to the peak value of the light spectra, whereby the peak value of the beat noise is also decreased.

40 Claims, 18 Drawing Sheets

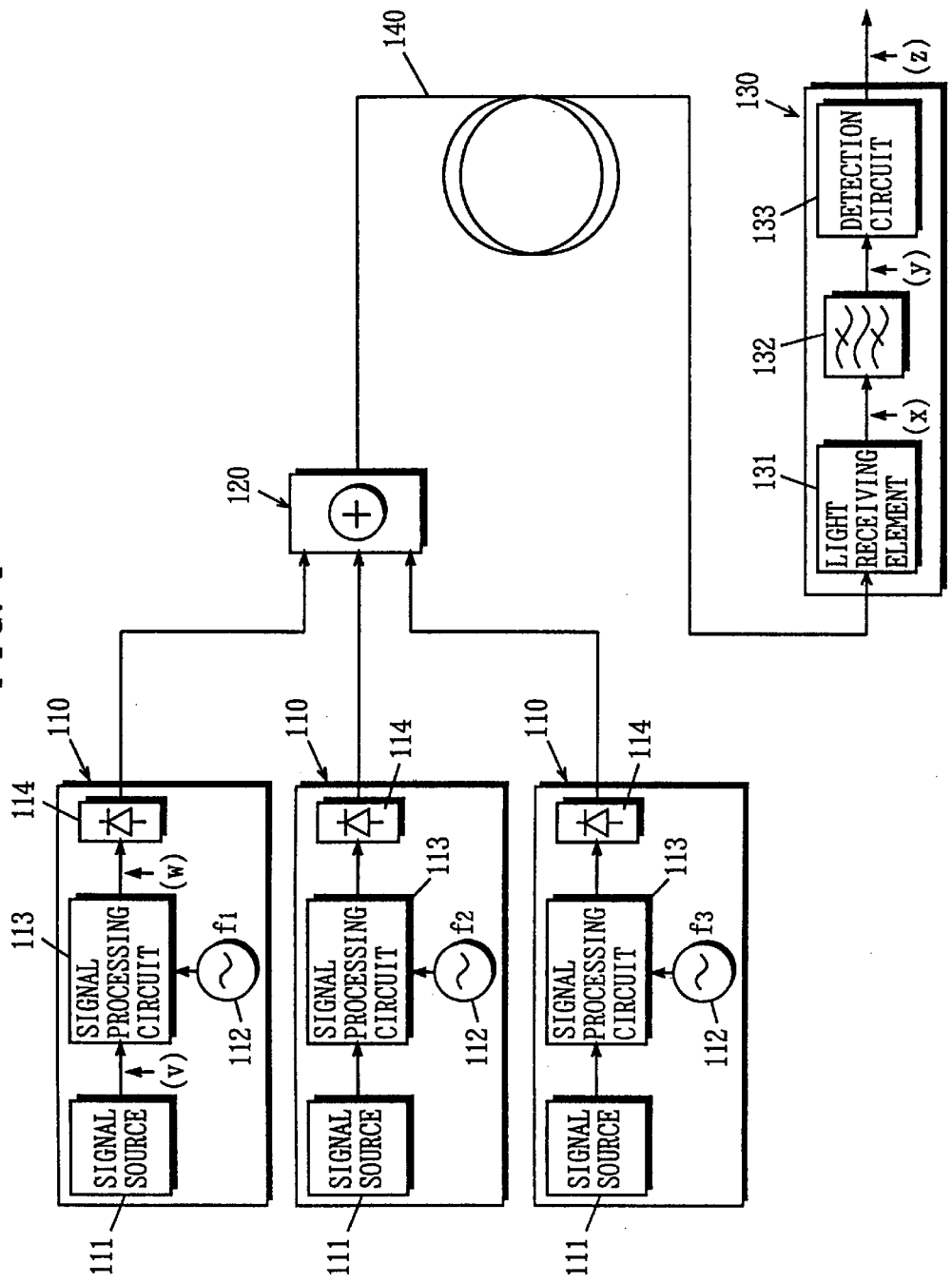

WAVEFORM OF ELECTRIC SIGNAL
TO BE TRANSMITTED

WAVEFORM OF LIGHT SIGNAL
OUTPUTTED FROM OPTICAL MODULATOR

SPECTRUM DISTRIBUTION OF
ELECTRIC SIGNAL AFTER RECEIVING

SPECTRUM DISTRIBUTION OF LIGHT SIGNAL
(NOT MODULATED BY PULSE TRAIN)

SPECTRUM DISTRIBUTION OF LIGHT SIGNAL
(MODULATED BY PULSE TRAIN)

WAVEFORM OF SECOND ELECTRIC
TRANSMISSION SIGNAL

WAVEFORM OF PULSED FREQUENCY-MODULATED
PULSE SIGNAL

WAVEFORM OF LIGHT SIGNAL OUTPUTTED FROM
OPTICAL MODULATOR

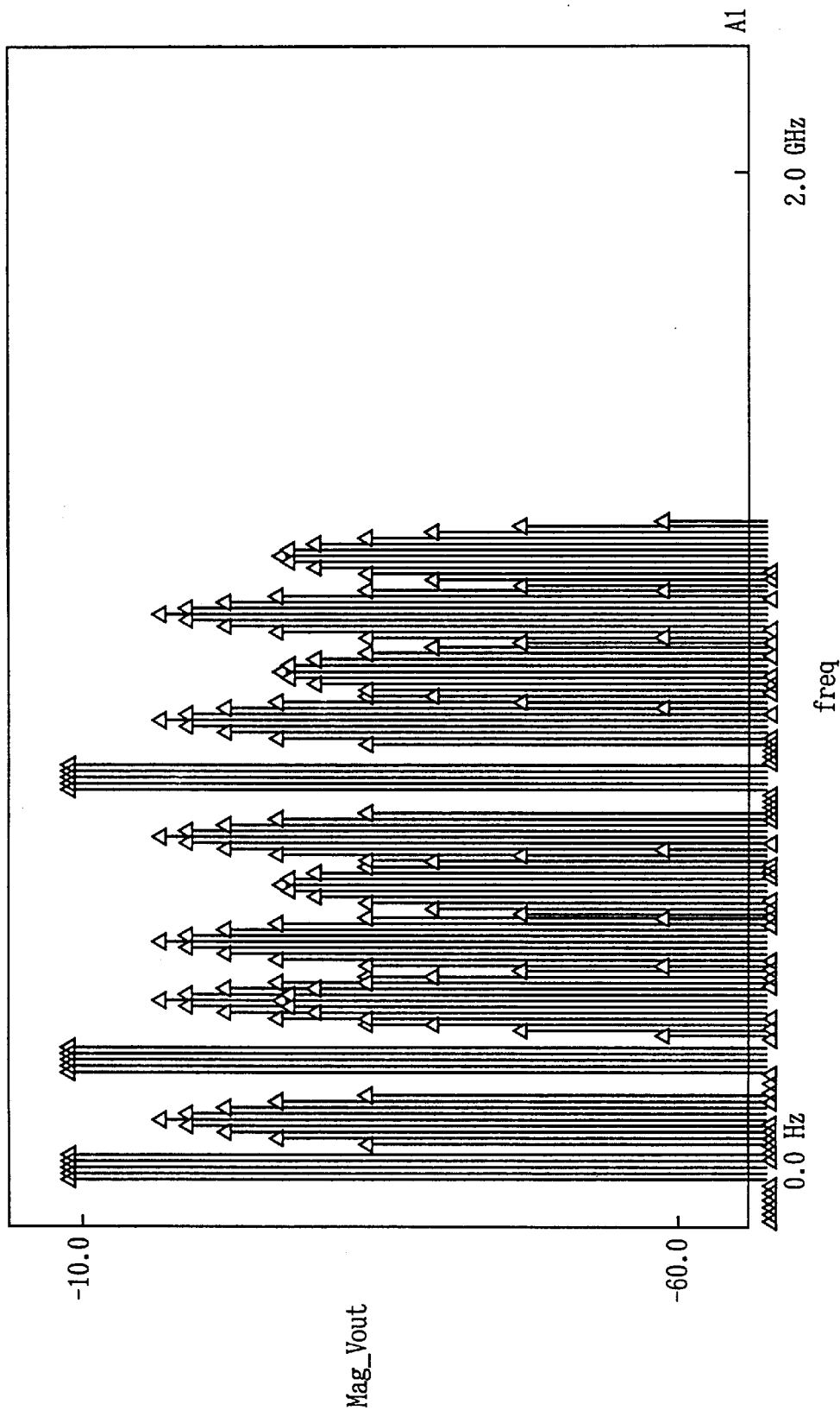

OPTICAL TRANSMISSION SYSTEM AND OPTICAL TRANSMISSION DEVICE USED THEREFOR

BACKGROUND OF THE INVENTION

1. Field of the Invention

The present invention relates to an optical transmission system, and more particularly, to an optical transmission system for multiplexing a plurality of optical modulation signals outputted from a plurality of optical transmission devices and transmitting an optical modulation signal obtained by the multiplexing through a common optical transmission channel.

2. Description of the Background Art

As a system for optically transmitting a plurality of electric signals collectively, an SCM (Sub-Carrier Multiplexing) transmission system has been known. The SCM transmission system is used in various fields such as a CATV (Cable Television), a video supervisory system, and transmission between radio stations for mobile communication because it can simultaneously transmit a plurality of electric signals.

(First SCM Transmission System)

A first SCM transmission system conventionally proposed is a system for subjecting sub-carrier signals which differ in frequency to amplitude modulation (AM), frequency modulation (FM) or phase modulation (PM) by an electric signal to be transmitted, multiplexing the modulated sub-carrier signals, converting a sub-carrier signal obtained by the multiplexing into a light intensity modulation signal, and sending out the light intensity modulation signal to an optical transmission channel such as an optical fiber.

FIG. 29 is a block diagram showing the construction of an optical transmission system using the first SCM transmission system. In FIG. 29, the optical transmission system comprises modulation circuits $10_1$ to $10_N$ for amplitude-modulating sub-carrier signals respectively having different frequencies $f_1$ to $f_N$ by input signals, a synthesizer 20, a semiconductor laser 30, and an optical fiber 40.

Operations performed by the optical transmission system shown in FIG. 29 will be simply described. Electric signals such as video signals, voice signals or data are inputted to the modulation circuits $10_1$ to $10_N$. Each of the modulation circuits $10_1$ to $10_N$ amplitude-modulates the sub-carrier signal by the inputted electric signal. Although in this example, amplitude modulation is employed as a modulation system, frequency modulation and phase modulation may be employed.

Currents $i_1$ to $i_N$ of output signals of the modulation circuits $10_1$ to $10_N$ are respectively given by the following equations $(1_1)$ to $(1_N)$:

$$i_1(t)=I_{01}(t)\cdot\cos(2\pi f_1 t+\phi_1) \quad (1_1)$$

$$i_2(t)=I_{02}(t)\cdot\cos(2\pi f_2 t+\phi_2) \quad (1_2)$$

$$i_N(t)=I_{0N}(t)\cdot\cos(2\pi f_N t+\phi_N) \quad (1_N)$$

$I_{01}(t), I_{02}(t), \ldots, I_{0N}(t)$ indicate current amplitudes, and $\phi_1, \phi_2, \ldots, \phi_N$ indicate phases in the foregoing equations $(1_1), (1_2), \ldots, (1_N)$. The output signals of the modulation circuits $10_1$ to $10_N$ are multiplexed by the synthesizer 20. A signal current $i_s$ obtained by the multiplexing is given by the following equation (2):

$$i_s(t)=i_1(t)+i_2(t)+\ldots+i_N(t) \quad (2)$$

The signal current $i_s$ is inputted to the semiconductor laser 30. Consequently, a light signal outputted from the semiconductor laser 30 is directly light intensity-modulated. Letting $I_{th}$ and $I_b$ be a threshold current and a bias current of the semiconductor laser 30, respectively, and letting $\xi$ [W/A] be the conversion efficiency of optical power par unit current, a light signal $P_s(t)$ outputted from the semiconductor laser 30 is given by the following equation (3):

$$\begin{aligned}P_s(t) &= \xi(I_b-I_{th})+\xi I_s(t) \\ &= P_0\cdot\{1+m_{01}(t)\cdot\cos(2\pi f_1 t+\phi_1)+ \\ &\quad m_{02}(t)\cdot\cos(2\pi f_2 t+\phi_2)+\ldots+ \\ &\quad m_{0N}(t)\cdot\cos(2\pi f_N t+\phi_N)\}\end{aligned} \quad (3)$$

In the foregoing equation (3), $m_{01}(t), m_{02}(t), \ldots, m_{0N}(t)$ are expressed by the following equations $(4_1), (4_2), \ldots, (4_N)$, and $P_0$ is expressed by the following equation (5):

$$m_{01}(t)=I_{01}(t)/(I_b-I_{th}) \quad (4_1)$$

$$m_{02}(t)=I_{02}(t)/(I_b-I_{th}) \quad (4_2)$$

$$m_{0N}(t)=I_{0N}(t)/(I_b-I_{th}) \quad (4_N)$$

$$P_0=\xi(I_b-I_{th}) \quad (5)$$

$m_{01}$ to $m_{0N}$ in the foregoing equations $(4_1)$ to $(4_N)$ are respectively referred to as light modulation factors. The light signal $P_s(t)$ given by the equation (3) is sent out to the optical fiber 40. An optical receiving device (not shown) converts the light signal transmitted by the optical fiber 40 to an electric signal, extracts a signal having one of the frequencies $f_1$ to $f_N$ by a band-pass filter, and demodulates the extracted signal. The SCM system can simultaneously transmit a plurality of electric signals by one optical fiber.

(Second SCM Transmission System)

As a second SCM transmission system conventionally proposed, a "multi-channel signal optical transmission device" disclosed in Japanese Patent Laid-Open No. 273444/1989 has been known. In the second SCM transmission system, each of a plurality of optical transmission devices modulates a sub-carrier signal by an electric signal including information to be transmitted, and converts the modulated sub-carrier signal into a light signal. The light signals from the respective optical transmission devices are simultaneously transmitted to an optical receiving device upon being gathered at one optical fiber using an optical coupler. The second SCM transmission system is suitable for a road supervisory system, transmission between radio stations for mobile communication, and the like.

(Problem in First SCM Transmission System)

In the above-mentioned first SCM transmission system, when an attempt to increase the number N of multiple signals inputted to the semiconductor laser 30 is made, the following problems arise. Specifically, when the number N of signals is increased, as expressed by the foregoing equation (2), the amplitude value of the signal current $i_s$ is gradually increased. When the amplitude value reaches not less than $(I_b-I_{th})$, a portion whose amplitude value is not more than $I_{th}$ in the time waveform of $i_s$ becomes a non-luminous state in the semiconductor laser 30. This phenomenon is generally referred to as clipping. When the clipping occurs, it is known that intermodulation distortion is rapidly increased (see Reference 1 by Tanabe et al., entitled "80 Channel AM-FDM TV Signal Optical Transmission Device", National Technical Report, Vol.36, No.6, December 1990).

The phenomenon of clipping will be described in more detail using a simple model.

Consider a case where only a sub-carrier signal is optically transmitted in FIG. 29. The light modulation factors in a case where only the sub-carrier signal is outputted in a unmodulated state where there is no input signal in the modulation circuits $10_1$ to $10_N$ are respectively taken as $m_1$, $m_2, \ldots, m_N$. At this time, the light signal $P_s(t)$ outputted from the semiconductor laser 30 is given by the following equation (6):

$$P_s(t) = \{ P_0 \cdot \{1 + m_1(t) \cdot \cos(2\pi f_1 t + \phi_1) + \quad (6)$$
$$m_2(t) \cdot \cos(2\pi f_2 t + \phi_2) + $$
$$m_N(t) \cdot \cos(2\pi f_N t + \phi_N)\}$$

FIG. 30 illustrates the relationship between an input current and optical power of the semiconductor laser 30. When the bias current $l_b$ and the signal current $i_s$ are inputted to the semiconductor laser 30, the light signal $P_s$ is outputted from the semiconductor laser 30. Consider a case where the maximum amplitude value of the following AC component in the equation (6) exceeds one:

$$\{ m_1(t) \cdot \cos(2\pi f_1 t + \phi_1) + m_2(t) \cdot \cos(2\pi f_2 t + \phi_2) + \ldots + $$
$$m_N(t) \cdot \cos(2\pi f_N t + \phi_N)\}$$

Further, consider a case where the following value becomes negative:

$$\{1 + m_1(t) \cdot \cos(2\pi f_1 t + \phi_1) + m_2(t) \cdot \cos(2\pi f_2 t + \phi_2) + \ldots + $$
$$m_N(t) \cdot \cos(2\pi f_N t + \phi_N)\}$$

In this case, the semiconductor laser 30 enters a non-luminous state. Specifically, clipping occurs, whereby the waveform of $P_s$ is cut. When $\phi_1 = \phi_2 = \phi_3 = \ldots = \phi_N = 0$, $m_1 + m_2 + \ldots + m_N$ must be not more than one in order not to cause clipping. In the signal current $i_s$ after multiplexing, there is no time correlation between the sub-carrier signals, whereby a synthetic light modulation factor ma is defined by the effective value of an AC component. That is, it is expressed by the foregoing equation (7):

$$ma = \sqrt{(m_1^2 + m_2^2 + \ldots + m_N^2)} \quad (7)$$

ma expressed by the following equation (7) is also referred to as a synthetic effective modulation factor. According to the above-mentioned reference 1, when the synthetic effective modulation factor ma reaches not less than 0.45, intermodulation distortion is rapidly increased due to the effect of clipping.

In order to increase the number N of signals without causing clipping, there are some measures. For example, the bias current $l_b$ is increased, and the light modulation factor is decreased. However, the relative intensity noise (RIN) characteristics and the intermodulation distortion characteristics of outputted light in the semiconductor laser 30 depend on the bias current $l_b$, and there exists the bias current $l_b$ having the minimum RIN and relative modulation distortion characteristics. Therefore, the bias current $l_b$ is set to a certain fixed value. Further, the light modulation factor cannot be significantly decreased because the SN ratio of a signal after receiving is degraded if it is decreased. From the foregoing, the number N of signals which can be transmitted in a range in which no clipping occurs is limited.

(Problem in Second SCM Transmission System)

In the second SCM transmission system, a semiconductor laser is used as a light emitting element in each of the optical transmission devices. When the luminous wavelengths of the semiconductor lasers are in the same wavelength band, a plurality of light signals outputted from the respective optical transmission devices mutually interfere with each other in multiplexing the light signals by the optical coupler, whereby so-called beat noise is produced.

Furthermore, the light emitting element generates a light intensity modulation signal by an inputted electric signal. However, the light intensity modulation signal is simultaneously frequency-modulated by the change in the current value of the electric signal. This phenomenon is generally referred to as chirping. For example, when only a sub-carrier having a frequency f is inputted to the light emitting element, the spectra of the light wavelength of the light intensity modulation signal are distributed from the optical frequency of the light signal which is a carrier to a position of a frequency which is an integral multiple of f. Beat noise is also produced by mutual interference of the spectra.

When the frequencies of the above-mentioned beat noise are distributed in the vicinity of the frequency of the sub-carrier, the SN ratio of a received signal is degraded, to prevent high-quality information from being transmitted. With respect to the problem, solutions have been proposed in Japanese Patent Laid-Open No. 177840/1994, Japanese Patent Laid-Open No. 252850/1994 and Japanese Patent Laid-Open No. 104843/1994.

In an "optical communication system" disclosed in Japanese Patent Laid-Open No. 177840/1994, the carrier wavelengths of light signals outputted from light source elements at transmission terminals are varied periodically and independently at the transmission terminals, to reduce the distribution of beat noise in the vicinity of the frequency of a sub-carrier. As a method of varying the center optical frequency of the light signal, such construction that the temperature of a semiconductor laser which is a light emitting element or a bias current is varied is employed. Specifically as a method of varying the bias current, a modulation signal is superimposed on a signal to be transmitted, and a signal obtained by the superposition is inputted to the semiconductor laser.

The magnitude of the beat noise depends on the field intensities of two light signals which interfere with each other and angles made between the respective planes of polarization of the two light signals. In a "multi-station type optical transmission system" disclosed in Japanese Patent Laid-Open No. 252850/1994, a plane of polarization of the light signal emitted from a light emitting terminal is varied in time, to disperse the effect of the beat noise.

In a "noise and distortion suppressor of an optical fiber system" disclosed in Japanese Patent Laid-Open No. 104843/1994, a chirping signal is superimposed on a signal to be transmitted, to modulate (chirp) the optical frequency of laser light to diffuse the spectra of the laser light.

As described in the foregoing, according to the system disclosed in Japanese Patent Laid-Open No. 177840/1994 or Japanese Patent Laid-Open No. 104843/1994, a modulation signal or a chirping signal is superimposed on a signal to be transmitted. Therefore, the amplitude value of an electric signal inputted to the semiconductor laser is increased, so that a synthetic effective modulation factor in the semiconductor laser is increased. In order to keep the synthetic effective modulation factor constant not to cause clipping, the light modulation factor of the signal to be transmitted must be decreased. When the light modulation factor is decreased, however, there arises another problem that the SN ratio of the signal after receiving is degraded.

Furthermore, according to a system disclosed in Japanese Patent Laid-Open No. 252850/1994, construction for varying a plane of polarization of a light signal emitted from a light emitting terminal in time is required. Such construction is high in cost, whereby the cost of the system is increased.

SUMMARY OF THE INVENTION

Therefore, an object of the present invention is to provide an optical transmission system capable of increasing the number of sub-carrier signals without causing clipping or increasing the light modulation factor of each of the sub-carrier signals.

Another object of the present invention is to provide an optical transmission system capable of decreasing beat noise without causing clipping.

In order to attain the above-mentioned objects, the present invention has the following characteristics.

A first aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a signal source for generating a transmission signal including information to be transmitted, a carrier generation circuit for outputting a carrier, a signal processing section for subjecting the carrier to predetermined signal processing using the transmission signal, to produce an electric modulation signal amplitude-modulated by the transmission signal and so adapted that either one of its envelops on the high level side and the low level side has a shape analogous to the waveform of the transmission signal and the other envelop is at an approximately constant level, and a light source element for converting the electric modulation signal into a light signal.

As described in the foregoing, the signal processing section generates the electric modulation signal amplitude-modulated by the transmission signal and so adapted that either one of the envelops on the high level side and the low level side has a shape analogous to the waveform of the transmission signal and the other envelop is at an approximately constant level. If the level of the other envelop of the electric modulation signal is set to not less than the threshold value of the light source element, no clipping occurs in the light source element even if the amplitude of the electric modulation signal is increased. As a result, the modulation factor of the optical modulation signal outputted by the light source element can be increased without causing intermodulation distortion by clipping. If the modulation factor in the light source element is increased, the chirping amount is increased, whereby the spectrum distribution of the optical modulation signal also greatly expands. As a result, the peak value of the spectrum distribution of beat noise is decreased. Specifically, the power level of the beat noise is decreased. Consequently, the beat noise can be effectively decreased without degrading the SNR (Signal to Noise Ratio).

In the above-mentioned first aspect, examples of the carrier include a sine wave having a predetermined frequency, a square wave, and a signal angle-modulated by a particular signal. When the sine wave is used as the carrier, the carrier generation circuit can be realized by a simple circuit configuration. On the other hand, when the square wave or the angle modulation signal is used as the carrier, the configuration of the carrier generation circuit is slightly complicated. However, the square wave or the angle modulation signal has more frequency components than that of the sine wave. Therefore, the spectrum distribution of the optical modulation signal further expands by using the square wave or the angle modulation signal having a lot of high frequency components as the carrier, whereby the effect of the beat noise can be further reduced.

In the above-mentioned first aspect, a first example of the construction of the signal processing section comprises an amplitude modulation section for amplitude-modulating the carrier by the transmission signal, and a clipping section for clipping an output signal of the amplitude modulation section at a predetermined level. Further, a second example of the construction of the signal processing section comprises a multiplier for multiplying the transmission signal by which a predetermined voltage is offset and the carrier by which a predetermined voltage is offset together. A third example of the construction of the signal processing section comprises an addition section for adding the transmission signal and the carrier together, and a clipping section for clipping an output signal of the addition section at a predetermined level. A fourth example of the construction of the signal processing section comprises an amplitude modulation section for amplitude-modulating the carrier by the transmission signal, and an adder for adding an output signal of the amplitude modulation section and the transmission signal together. A fifth example of the construction of the signal processing section comprises an angle modulation section for angle-modulating the carrier by the transmission signal, an adder for adding an output signal of the angle modulation section and the transmission signal together, and a clipping section for clipping an output signal of the adder at a predetermined level. In any one of the examples of the construction, the signal processing section generates the electric modulation signal amplitude-modulated by the transmission signal and so adapted that either one of the envelops on the high level side and the low level side has a shape analogous to the waveform of the transmission signal and the other envelop is at an approximately constant level.

A second aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a first conversion circuit for converting a transmission signal including information to be transmitted into a first light intensity modulation signal, and a second conversion circuit for intensity-modulating the first light intensity modulation signal by a pulse train and converting the first light intensity modulation signal into a second light intensity modulation signal, the second light intensity modulation signals from the respective optical transmission devices being multiplexed, and a second light intensity modulation signal obtained by the multiplexing being transmitted through the optical transmission line, the occupied frequency bands of the transmission signals being so set as to differ between the optical transmission devices, the basic frequency of the pulse train being set to a value which is not less than twice the maximum frequency of the transmission signal treated by each of the optical transmission devices.

According to the above-mentioned second aspect, the transmission signal is converted into the first light intensity modulation signal, after which the first light intensity modulation signal is further intensity-modulated by the pulse train, whereby the spectrum distribution of the light signal expands upon being dispersed. As a result, the peak value of the light signal is reduced, whereby the effect of beat noise can be reduced. Moreover, the transmission signal is inputted as it is to the first conversion circuit. Therefore, the amplitude value of the input signal can be made larger than that in a case where the other signal is inputted upon being superimposed on the transmission signal as in the conventional example. As a result, clipping can be prevented from occurring without decreasing a light modulation factor. Further, the basic frequency of the pulse train is set to a value which is not less than twice the maximum frequency of the transmission signal treated by each of the optical transmission devices, whereby crosstalk interference can be prevented from occurring when the signals are separated from each other at the time of receiving.

The first conversion circuit in the above-mentioned second aspect is constituted by a light emitting element for directly intensity-modulating generated light by the transmission signal by way of example. Further, the first conversion circuit may be constituted by a light emitting element for outputting light having a predetermined wavelength, and an optical modulator for externally modulating the outputted light of the light emitting element by the transmission signal.

In the above-mentioned second aspect, a signal obtained by superimposing the pulse train on the transmission signal may be inputted to the optical modulator. Consequently, one optical modulator can be used as the first and second conversion circuits, whereby the optical system configuration can be simplified A third aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a modulation circuit for modulating a sub-carrier by a transmission signal including information to be transmitted to output an electric modulation signal, a first conversion circuit for converting the electric modulation signal into a first light intensity modulation signal, and a second conversion circuit for intensity-modulating the first light intensity modulation signal by a pulse train and converting the intensity-modulated first light intensity modulation signal into a second light intensity modulation signal, the second light intensity modulation signals from the respective optical transmission devices being multiplexed, and a second light intensity modulation signal obtained by the multiplexing being transmitted through the optical transmission line, the frequencies of the sub-carriers being so set as to differ between the optical transmission devices, the basic frequency of the pulse train being set to a value which is not less than twice the maximum frequency of the sub-carrier treated by each of the optical transmission devices.

In the above-mentioned third aspect, the sub-carrier is modulated by the transmission signal, after which the modulated sub-carrier is converted into the first light intensity modulation signal, whereby the spectrum distribution of the light signal further expands upon being dispersed, as compared with that in the second aspect. Consequently, a larger effect of reducing beat noise can be obtained. Further, the frequency of the sub-carrier is set to a value which is not less than twice the maximum frequency of the transmission signal treated by each of the optical transmission devices, whereby crosstalk interference can be prevented from occurring when the signals are separated from each other at the time of receiving.

A fourth aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a first conversion circuit for converting a transmission signal including information to be transmitted into a first light intensity modulation signal, a pulsed FM circuit for pulsed frequency-modulating a sub-carrier by a predetermined electric signal to output a pulse-shaped electric signal, and a second conversion circuit for intensity-modulating the first light intensity modulation signal by the pulse-shaped electric signal and converting the intensity-modulated first light intensity modulation signal into a second light intensity modulation signal, the second light intensity modulation signals from the respective optical transmission devices being multiplexed, and a second light intensity modulation signal obtained by the multiplexing being transmitted through the optical transmission line, the occupied frequency bands of the transmission signals being so set as to differ between the optical transmission devices, the frequency of the sub-carrier being set to a value which is not less than twice the maximum frequency of the transmission signal treated by each of the optical transmission devices.

According to the above-mentioned fourth aspect, the first light intensity modulation signal is further intensity-modulated by the pulse-shaped electric signal obtained upon pulsed frequency-modulating the sub-carrier by the predetermined electric signal, whereby the spectrum distribution of the light signal further expands upon being dispersed, as compared with that in the second aspect. Consequently, a larger effect of reducing beat noise can be obtained. Further, the frequency of the sub-carrier is set to a value which is not less than twice the maximum frequency of the transmission signal treated by each of the optical transmission devices, whereby crosstalk interference can be prevented from occurring when the signals are separated from each other at the time of receiving.

According to the above-mentioned fourth aspect, in a preferred embodiment, the frequencies of the sub-carriers are so set as to differ between the optical transmission devices. Further, the occupied frequency bands of the predetermined electric signals are so set as to differ between the optical transmission devices.

A fifth aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a first conversion circuit for converting a transmission signal including information to be transmitted into a first light intensity modulation signal, and a second conversion circuit for intensity-modulating the intensity-modulated first light intensity modulation signal by a pulse train and converting the first light intensity modulation signal into a second light intensity modulation signal, the second light intensity modulation signals from the respective optical transmission devices being multiplexed, and a second light intensity modulation signal obtained by the multiplexing being transmitted through the optical transmission line, the basic frequency of the pulse train being set to a value which is not less than twice the maximum frequency of the transmission signal treated by each of the optical transmission devices, the spacing between the basic frequencies of the pulse trains treated by the two arbitrary optical transmission devices being set to a value larger than the sum of the maximum frequencies in the respective occupied frequency bands of the transmission signals treated by the two optical transmission devices.

According to the above-mentioned fifth aspect, the transmission signal is converted into the first light intensity modulation signal, after which the first light intensity modulation signal is further intensity-modulated by the pulse train, whereby the same effect as that in the above-mentioned second aspect is obtained.

A sixth aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a pulse light generation circuit for outputting a pulse-shaped light signal, and a conversion circuit for intensity-modulating the pulse-shaped light signal by a transmission signal including information to be transmitted and converting the intensity-modulated light signal into a light intensity modulation signal, the light intensity modulation signals from the respective optical transmission devices being multiplexed, and a light intensity modulation signal obtained by the multiplexing being transmitted through the optical transmission line, the occupied frequency bands of the transmission signals being so set as to differ between the optical transmission devices, the basic frequency of the pulse-shaped light signal being set to a value which is not less than twice the maximum frequency of the transmission signal treated by each of the optical transmission devices.

As described in the foregoing, in the sixth aspect, the pulse-shaped light signal is previously generated, and the pulse-shaped light signal is converted into the light intensity modulation signal upon being intensity-modulated by the transmission signal. The sixth aspect only differs in the order of processing from the above-mentioned second aspect, whereby the same effect as that in the second aspect is produced.

In the above-mentioned sixth aspect, the pulse light generation circuit is constituted by a pulse signal generation circuit for generating a pulse-shaped electric signal, and a light emitting element for directly intensity-modulating generated light by the pulse-shaped electric signal by way of example. Further, the pulse light generation circuit may be constituted by a light emitting element for outputting light having a predetermined wavelength, a pulse signal generation circuit for generating a pulse-shaped electric signal, and an optical modulator for externally modulating the outputted light from the light emitting element by the pulse-shaped electric signal.

In the above-mentioned sixth aspect, according to a preferred embodiment, a signal obtained by superimposing the transmission signal on the pulse-shaped electric signal is inputted to the optical modulator. Consequently, one optical modulator can be used as the pulse light generation circuit and the conversion circuit, whereby the optical system configuration can be simplified.

A seventh aspect of the present invention is directed to an optical transmission device for converting an electric signal into a light signal and transmitting the light signal, comprising a plurality of element signal generation sections for each generating an element signal obtained by adding a direct current signal to an RF signal, a multiplication section for multiplying the element signals together to output a cumulative signal, and an optical modulation section for converting the cumulative signal into a light intensity modulation signal, the respective occupied frequencies of the RF signals being so arranged that they are not overlapped with each other and they are not overlapped with the frequency of higher harmonics produced by multiplying the RF signals together, the maximum amplitude value of the RF signal included in each of the element signals being set to a value which is not more than the magnitude of the direct current signal.

According to the seventh aspect, the plurality of element signals each obtained by adding the direct current signal to the RF signal are multiplied together to generate the cumulative signal, and the cumulative signal is converted into the light intensity modulation signal, whereby the number of RF signals can be increased without changing light modulation factors and causing clipping.

In the above-mentioned seventh aspect, according to a preferred embodiment, the RF signal included in each of the element signals is constituted by modulation signals which differ in the carrier frequency, and the value of the square root corresponding to the sum of squares of the amplitude values of the respective modulation signals is set to a value which is not more than the magnitude of the direct current signal. If one element signal is thus generated with respect to the plurality of modulation signals, the band of the cumulative signal can be narrowed, as compared with that in a case where the element signal is generated with respect to each of the modulation signals.

An eighth aspect of the present invention is directed to an optical transmission system for multiplexing a plurality of optical modulation signals outputted from a plurality of optical transmission devices and transmitting an optical modulation signal obtained by the multiplexing through a common optical transmission line, wherein each of the optical transmission devices comprises a plurality of element signal generation sections for each generating an element signal obtained by adding a direct current signal to an RF signal, a multiplication section for multiplying the element signals together to output a cumulative signal, and an optical modulation section for converting the cumulative signal into a light intensity modulation signal, the respective occupied frequencies of the RF signals being so arranged that they are not overlapped with each other and they are not overlapped with the frequency of higher harmonics produced by multiplying the RF signals together, the maximum amplitude value of the RF signal included in each of the element signals being set to a value which is not more than the magnitude of the direct current signal.

According to the above-mentioned eighth aspect, the plurality of element signals each obtained by adding the direct current signal to the RF signal are multiplied together, to generate the cumulative signal, and the cumulative signal is converted into the light intensity modulation signal, whereby the number of RF signals can be increased without changing light modulation factors and causing clipping. Further, the spectra of the light intensity modulation signal are diffused, whereby the effect of beat noise can be reduced.

In the above-mentioned eighth aspect, according to a preferred embodiment, the element signal generation section in each of the optical transmission devices comprises a first element signal generation section for generating a first element signal obtained by adding a direct current signal to a first RF signal arranged on the low frequency side, a second element signal generation section for generating a second element signal obtained by adding a direct current signal to a second RF signal arranged on the high frequency side, the frequencies of the first RF signals in the respective optical transmission devices being so set as to be equal between all the optical transmission devices and being so set as to be larger than the maximum value of the frequency bandwidths of the second RF signals treated by all the optical transmission devices, the spacing between the center frequencies of the second RF signals in the optical transmission devices being set to spacing which is not less than twice the frequency of the first RF signal.

In the above-mentioned eighth aspect, according to another preferred embodiment, the element signal generation section in each of the optical transmission devices comprises a first element signal generation section for generating a first element signal obtained by adding a direct current signal to a first RF signal arranged on the low frequency side, a second element signal generation section for generating a second element signal obtained by adding a direct current signal to a second RF signal arranged on the high frequency side, the frequencies of the first RF signals in the optical transmission devices being so set as to be equal between all the optical transmission devices and being so set as to be larger than the difference between the maximum frequency and the minimum frequency of the second RF signals treated by all the optical transmission devices.

In the above-mentioned eighth aspect, according to still another preferred embodiment, the element signal generation section in each of the optical transmission devices comprises a first element signal generation section for generating a first element signal obtained by adding a direct current signal to a first RF signal arranged on the low frequency side, a second element signal generation section for generating a second element signal obtained by adding a direct current signal to a second RF signal arranged on the high frequency side, the frequencies of the second RF signals in the optical transmission devices being so set as to be equal to each other between all the optical transmission devices, the occupied frequencies of the first RF signals in the optical transmission devices being so set as to differ between the optical transmission devices, the center frequency of the second RF signal in each of the optical transmission devices being set to a frequency which is not less than twice the maximum frequency of the first RF signals treated by all the optical transmission devices.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the construction of an optical transmission system according to a first embodiment of the present invention;

FIG. 23 is a diagram showing the spectrum distribution of an output signal in a principal part of the optical transmission device shown in FIG. 21;

DESCRIPTION OF THE PREFERRED EMBODIMENTS (First Embodiment)

FIG. 1 is a block diagram showing the construction of an optical transmission system according to a first embodiment of the present invention. In FIG. 1, the optical transmission system comprises a plurality of transmission terminals 110 for respectively generating light signals light intensity-modulated, an optical coupler 120 for multiplexing the light signals which are generated in the respective transmission terminals 110, an optical fiber 140 for transmitting a light signal obtained by the multiplexing which is outputted from the optical coupler 120, and a receiving terminal 130 for demodulating the received light signal. Although in FIG. 1, the transmission terminals 110 at three stations are illustrated by way of example, the number of transmission terminals to be connected is not limited to the same.

Figure 2A:
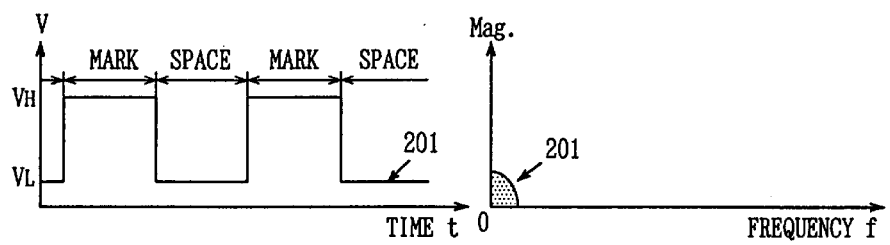
FIG. 2 is a diagram showing the spectrum distribution of a signal in a principal part of the optical transmission system shown in FIG. 1.

Each of the transmission terminals 110 comprises a signal source 111, a carrier generation circuit 112, a signal processing circuit 113, and a light source 114. The signal source 111 generates an input signal 201 including transmission information (see FIG. 2(a)). As shown in FIG. 2(a), the signal source 111 in the present embodiment generates a binary digital signal as an example of the input signal 201. The input signal 201 generated by the signal source 111 may be a signal which has not been modulated (for example, a base band signal) or a signal which has been already modulated. The carrier generation circuit 112 generates a carrier having a predetermined frequency. Frequencies which are not overlapped with each other for the respective transmission terminals 110 are respectively assigned to the carriers generated by the carrier generation circuits 112. As an example, the carrier generation circuits 112 in the respective transmission terminals 110 generate sine waves having frequencies $f_1$, $f_2$ and $f_3$.

The signal processing circuit 113 inputs the input signal 201 and the carrier, respectively, from the signal source 111 and the carrier generation circuit 112, and subjects the inputted signals to signal processing inherent in the present invention. Consequently, the signal processing circuit 113 outputs an electric modulation signal 202 amplitude-modulated by the input signal 201 and so adapted that either one of its envelop on the high level side (hereinafter referred to as an upper envelop) and its envelop on the low level side (hereinafter referred to as a lower envelop) has a shape analogous to the waveform of the input signal 201 and the other envelop is in an approximately flat state (see FIG. 2(b)). Although the signal processing circuit 113 in the present embodiment outputs the electric modulation signal 202 so adapted that the upper envelop has a shape analogous to the waveform of the input signal 201 and the lower envelop is in an approximately flat state by way of example, it may output an electric modulation signal so adapted that its lower envelop has a shape analogous to the waveform of the input signal 201 and its upper envelop is in an approximately flat state. Even if such signal processing is performed in the signal processing circuit 113, the amplitude of the electric modulation signal 202 still changes depending on the waveform of the input signal 201. Consequently, information included in the input signal 201 is transmitted without being lost. An example of the detailed construction of the signal processing circuit 113 will be described later.

The light source 114 is composed of a semiconductor laser or the like. The electric modulation signal 202 from the signal processing circuit 113 is inputted to the light source 114. The light source 114 converts the electric modulation signal 202 into a light signal light intensity-modulated (hereinafter referred to as a light intensity modulation signal), and outputs the light intensity modulation signal to the optical fiber 140. The optical coupler 120 multiplexes a plurality of light intensity modulation signals outputted from the respective transmission terminals 110, and sends out a light intensity modulation signal obtained by the multiplexing to the optical fiber 140.

The receiving terminal 130 comprises a light receiving element 131, a variable band-pass filter 132, and a detection circuit 133. The light receiving element 131 collectively receives the light intensity modulation signal obtained by the multiplexing which is transmitted through the optical fiber 140, and converts the received light intensity modulation signal into an electric modulation signal 203 (see FIG. 2(c)). Examples of the light receiving element 131 include a photodiode. The variable band-pass filter 132 changes the band of a signal passing through the filter, to extract an electric modulation signal at the desired transmission terminal 110. FIG. 2 illustrates a case where an electric modulation signal 204 (see FIG. 2(d)) at the transmission terminal 110 having a carrier frequency $f_1$ is extracted from the electric modulation signal 203 generated at each of the transmission terminals 110. The detection circuit 133 subjects the electric modulation signal 204 extracted by the variable band-pass filter 132 to envelop detection or synchronous detection. Consequently, the receiving terminal 130 obtains the same output signal 205 (see FIG. 2(e)) as the input signal 201 generated by the signal source 111 at each of the transmission terminals 110.

FIG. 2 is a diagram showing the spectrum distribution of a signal in each of principal parts (v), (w), (x), (y) and (z) of the optical transmission system shown in FIG. 1.

FIG. 2(a) illustrates the time waveform and the frequency spectrum distribution of a signal outputted from the signal source 111 shown in FIG. 1, that is, the input signal 201 at the principal part (v). The input signal 201 shall be a binary digital signal, as described above. The input signal 201 is a signal composed of only a low frequency component. Therefore, the frequency spectra are distributed in the vicinity of "0" on the frequency axis.

Figure 2B:
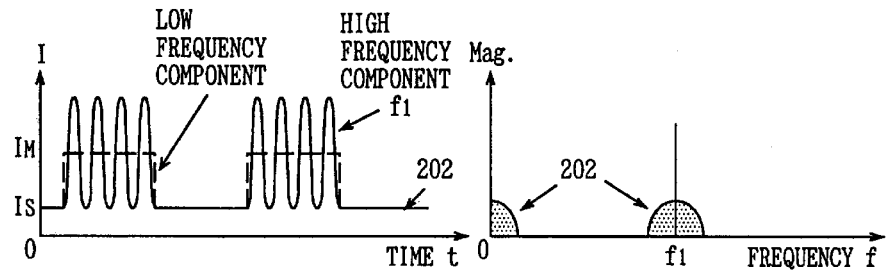

FIG. 2(b) illustrates the time waveform and the frequency spectrum distribution of a signal outputted from the signal processing circuit 113 shown in FIG. 1, that is, the electric modulation signal 202 at the principal part (w). The signal processing circuit 113 has a sine wave having the frequency $f_1$ and the input signal 201 as inputs, generates the electric modulation signal 202 in the above-mentioned procedure, and outputs the generated electric modulation signal 202. Consequently, the electric modulation signal 202 has a low frequency component and a high frequency component. Therefore, the frequency spectra of the electric modulation signal 202 are distributed in the vicinity of "0" and "$f_1$" on the frequency axis.

Figure 2C:
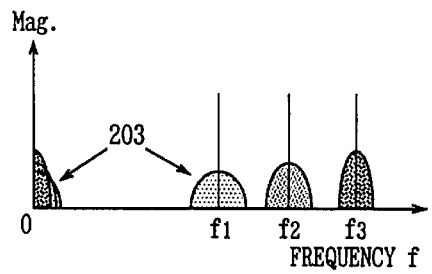

FIG. 2(c) illustrates the frequency spectrum distribution of a signal outputted from the light receiving element 131 shown in FIG. 1, that is, the signal 203 at the principal part (x). The signal 203 outputted by the light receiving element 131 includes the electric modulation signal 202 generated at each of the transmission terminals 110. Therefore, the frequency spectra of the signal 203 are distributed in the vicinity of "0", "$f_1$", "$f_2$" and "$f_3$" on the frequency axis.

Figure 2D:
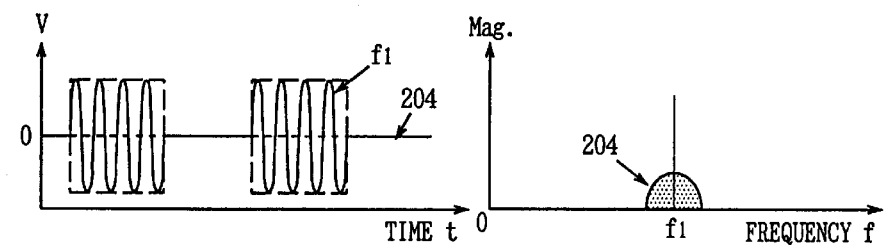

FIG. 2(d) illustrates the time waveform and the frequency spectrum distribution of a signal outputted from the variable band-pass filter 132 shown in FIG. 1, that is, the signal 204 at the principal part (y). In FIG. 2(d), the variable band-pass filter 132 extracts, as an example, the electric modulation signal 204 corresponding to a transmitted signal from the transmission terminal 110 which is assigned the frequency $f_1$. At this time, the variable band-pass filter 132 extracts only a high-frequency component. Therefore, the frequency spectra of the electric modulation signal 204 are distributed only in the vicinity of "$f_1$" on the frequency axis.

Figure 2E:
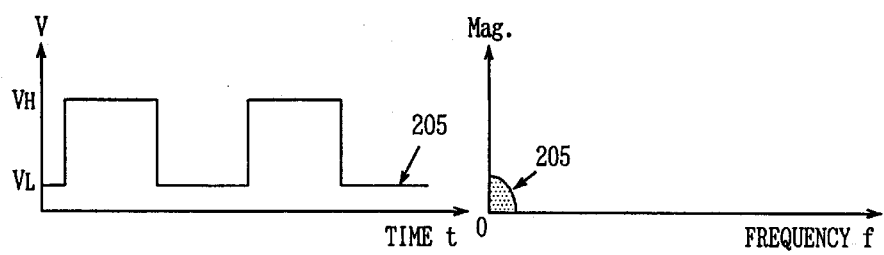

FIG. 2(e) illustrates the time waveform and the frequency spectrum distribution of a signal outputted from the detection circuit 133 shown in FIG. 1, that is, the signal 205 at the principal part (z). The detection circuit 133 performs envelop detection and synchronous detection, whereby the output signal 205 having a shape analogous to that of the input signal 201 can be obtained.

As described in the foregoing, the signal processing circuit 113 outputs the electric modulation signal 202 amplitude-modulated by the input signal 201 and so adapted that the upper envelop has a shape analogous to the waveform of the input signal 201 and the lower envelop is in an approximately flat state. If the level of the lower envelop of the electric modulation signal 202 is set to a value which is not less than the threshold value of the light source 114, no clipping occurs in the light source 114 even if the amplitude of the electric modulation signal 202 is increased. As a result, the modulation factor of the light intensity modulation signal outputted from the light source 114 can be increased without causing intermodulation distortion by clipping. If the modulation factor in the light source 114 is increased, the chirping amount is increased, so that the spectrum distribution of the optical modulation signal greatly expands. As a result, the peak value of the spectrum distribution of beat noise is decreased. That is, the power level of the beat noise is decreased. Consequently, the beat noise can be effectively decreased without degrading the SNR (Signal to Noise Ratio).

In the above-mentioned embodiment, the carrier generation circuits 112 in the respective transmission terminals 110 shown in FIG. 1 are respectively assigned the frequencies $f_1$, $f_2$ and $f_3$ which are not overlapped with each other. However, the frequencies of the carriers generated by the carrier generation circuits 112 can be made the same by using such an arrangement that the occupied frequency bands of the input signals 201 generated by the signal sources 111 are not overlapped with each other. In this case, only a signal component in the occupied frequency band of the desired input signal 201 is extracted from the received signal by the variable band-pass filter 132.

Although the transmission terminal 110 comprises a single signal source 111 and a single carrier generation circuit 112, it may comprise a plurality of signal sources 111. Further, the number of carrier generation circuits 112 may be any number, provided that it is not more than the number of signal sources 111.

The more specific construction of the signal processing circuit 113 shown in FIG. 1 will be described in detail with reference to the drawings.

Figure 3:
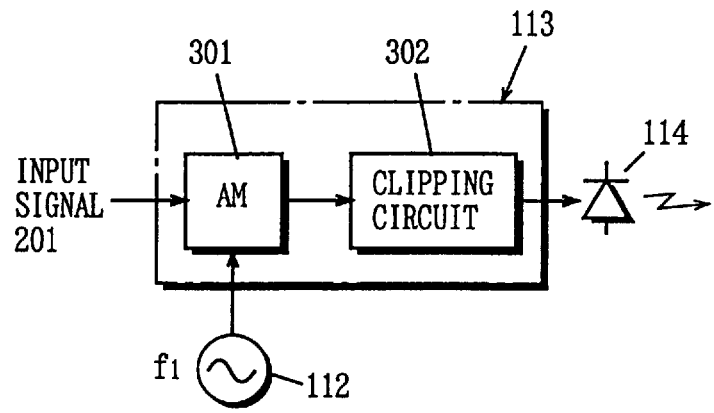
FIG. 3 is a block diagram showing a first example of the construction of a signal processing circuit shown in FIG. 1.

FIG. 3 is a block diagram showing a first example of the construction of the signal processing circuit 113 shown in FIG. 1. In FIG. 3, the signal processing circuit 113 in the example of the construction comprises an amplitude modulation circuit 301 and a clipping circuit 302. The input signal 201 generated in the signal source 111 and the carrier generated in the carrier generation circuit 112 are inputted to the amplitude modulation circuit 301. The carrier shall be a sine wave having a frequency $f_1$ in the example of the construction. The amplitude modulation circuit 301 amplitude-modulates the carrier by the input signal 201, to generate an amplitude modulation signal. The amplitude modulation circuit 301 outputs the amplitude modulation signal to the clipping circuit 302. The clipping circuit 302 cuts away a portion whose level is not more than a predetermined level of the amplitude modulation signal. In the example of the construction, the clipping circuit 302 cuts away a portion whose value is not more than the average value of the inputted signal. Consequently, an electric modulation signal 202 so adapted that its upper envelop has a shape analogous to the waveform of the input signal 201 and its lower envelop is in an approximately flat state is outputted from the clipping circuit 302.

Figure 4:
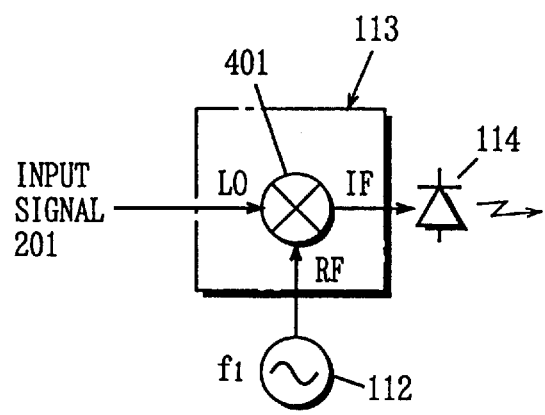
FIG. 4 is a block diagram showing a second example of the construction of a signal processing circuit shown in FIG. 1.

FIG. 4 is a block diagram showing a second example of the construction of the signal processing circuit 113 shown in FIG. 1. In FIG. 4, the signal processing circuit 113 in the example of the construction includes a mixer 401. The mixer 401 has an LO terminal, an RF terminal and an IF terminal. The input signal 201 generated in the signal source 111 is inputted to the LO terminal. The carrier generated in the carrier generation circuit 112 is inputted to the RF terminal. Further, a DC voltage is offset at both the LO terminal and the RF terminal. Consequently, an electric modulation signal 202 so adapted that its upper envelop has a shape analogous to the waveform of the input signal 201 and its lower envelop is in an approximately flat state is outputted from the IF terminal of the mixer 401.

Figure 5:
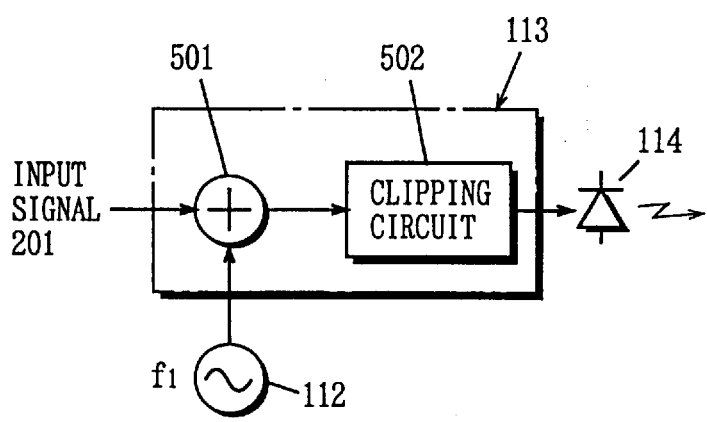
FIG. 5 is a block diagram showing a third example of the construction of the signal processing circuit shown in FIG. 1.

FIG. 5 is a block diagram showing a third example of the construction of the signal processing circuit 113 shown in FIG. 1. In FIG. 5, the signal processing circuit 113 in the example of the construction comprises an adder 501 and a clipping circuit 502. The adder 501 adds the input signal 201 and the carrier outputted from the carrier generation circuit 112 together, and outputs a signal obtained by the addition to the clipping circuit 502. The clipping circuit 502 cuts away a portion whose level is not more than a predetermined level of the inputted signal, to generate the electric modulation signal 202. In the example of the construction, the clipping circuit 502 cuts away a portion whose value is not more than the average value of the inputted signal. Consequently, an electric modulation signal 202 so adapted that its upper envelop has a shape analogous to the waveform of the input signal 201 and its lower envelop is in an approximately flat state is outputted from the clipping circuit 502.

Figure 6:
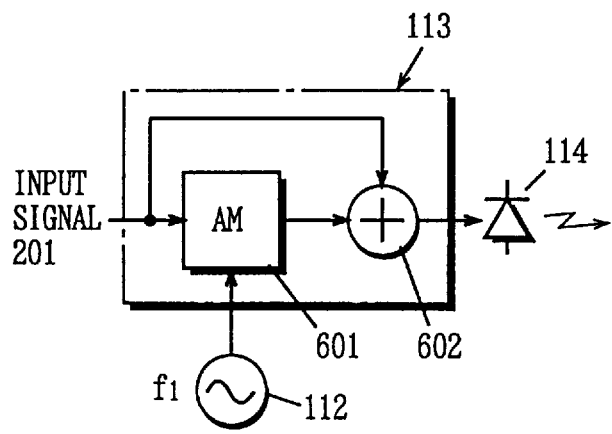
FIG. 6 is a block diagram showing a fourth example of the construction of the signal processing circuit shown in FIG. 1.

FIG. 6 is a block diagram showing a fourth example of the construction of the signal processing circuit 113 shown in FIG. 1. In FIG. 6, the signal processing circuit 113 in the example of the construction includes an amplitude modulation circuit 601 and an adder 602. The input signal 201 outputted from the signal source 111 is caused to branch into two signals. One of the signals is inputted to the amplitude modulation circuit 601, and the other signal is inputted to the adder 602. The amplitude modulation circuit 601 amplitude-modulates the carrier from the carrier generation circuit 112 by the input signal 201, and outputs the amplitude-modulated carrier to the adder 602. The adder 602 adds a signal outputted from the amplitude modulation circuit 601 and the input signal 201 together. Consequently, an electric modulation signal so adapted that its upper envelop has a shape analogous to the waveform of the input signal 201 and has its lower envelop is in an approximately flat state is outputted from the adder 602.

Figure 7:
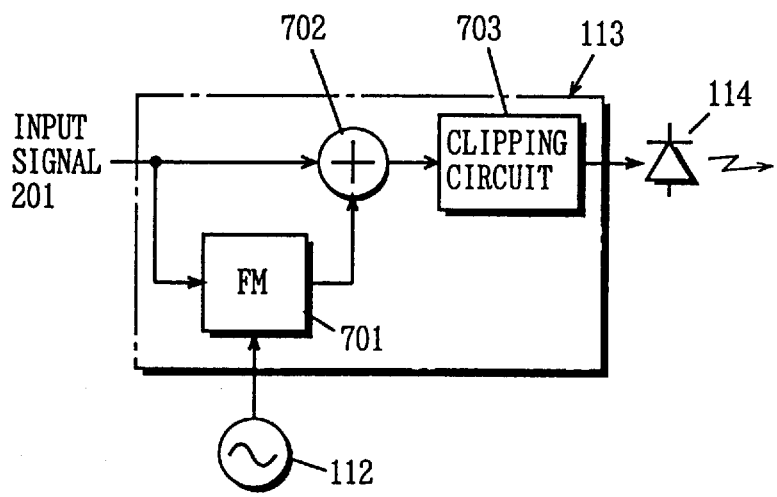
FIG. 7 is a block diagram showing a fifth example of the construction of the signal processing circuit shown in FIG. 1.

FIG. 7 is a block diagram showing a fifth example of the construction of the signal processing circuit 113 shown in FIG. 1. In FIG. 7, the signal processing circuit 113 in the example of the construction comprises a frequency modulation circuit 701, an adder 702, and a clipping circuit 703. The input signal 201 outputted from the signal source 111 is caused to branch into two signals. One of the signals is inputted to the frequency modulation circuit 701, and the other signal is inputted to the adder 702. The frequency modulation circuit 701 frequency-modulates the carrier from the carrier generation circuit 112 by the input signal 201, and outputs a signal obtained by the frequency modulation to the adder 702. The adder 702 adds the signal obtained by the frequency modulation and the input signal 201 together. An output signal of the adder 702 is fed to the clipping circuit 703. The clipping circuit 703 clips a portion, whose level is not more than (or not less than) a predetermined level, of the output signal of the adder 702. Consequently, an electric modulation signal 202 so adapted that its upper envelop has a shape analogous to the waveform of the input signal 201 and its lower envelop is in an approximately flat state is outputted from the clipping circuit 703.

As described in the foregoing, the signal processing circuits 113 shown in FIGS. 3, 5 and 7 respectively clip the signal waveforms by the clipping circuits 302, 502 and 703. Accordingly, the waveform of the electric modulation signal 202 outputted from the signal processing circuit 113 is such a shape that its lowermost part is cut away flat. Therefore, discontinuous points arise at an end of the portion cut away flat (i.e., a corner portion) in the waveform of the electric modulation signal 202. As a result, spurious is produced in a higher harmonic portion, whereby the spectrum distribution of the light intensity modulation signal outputted from the light source 114 further expands. On the other hand, the signal processing circuits 113 shown in FIGS. 4 and 6 realize a pseudo clipping effect so that the lower envelope of the electric modulation signal 202 enters an approximately constant level by operation processing without using a clipping circuit. Therefore, the waveform in the lowermost part of the electric modulation signal 202 continuously changes, whereby no spurious is produced in the higher harmonic portion. When the number of optical transmission devices 110 is large, and the frequency bandwidth occupied by the electric carrier is large, the circuit configurations shown in FIGS. 4 and 6 are effective.

In the above-mentioned embodiment, the carrier generation circuit 112 generates a sine wave having a predetermined frequency as a carrier. However, the carrier generation circuit 112 may generate a square wave or a carrier angle-modulated by a particular signal. The square wave or the angle-modulated carrier has more frequency components than those of the sine wave. Therefore, the electric modulation signal 202 generated using the square wave or the angle-modulated carrier can further reduce beat noise, as compared with the electric modulation signal generated using the sine wave.

(Second Embodiment)

Figure 8:
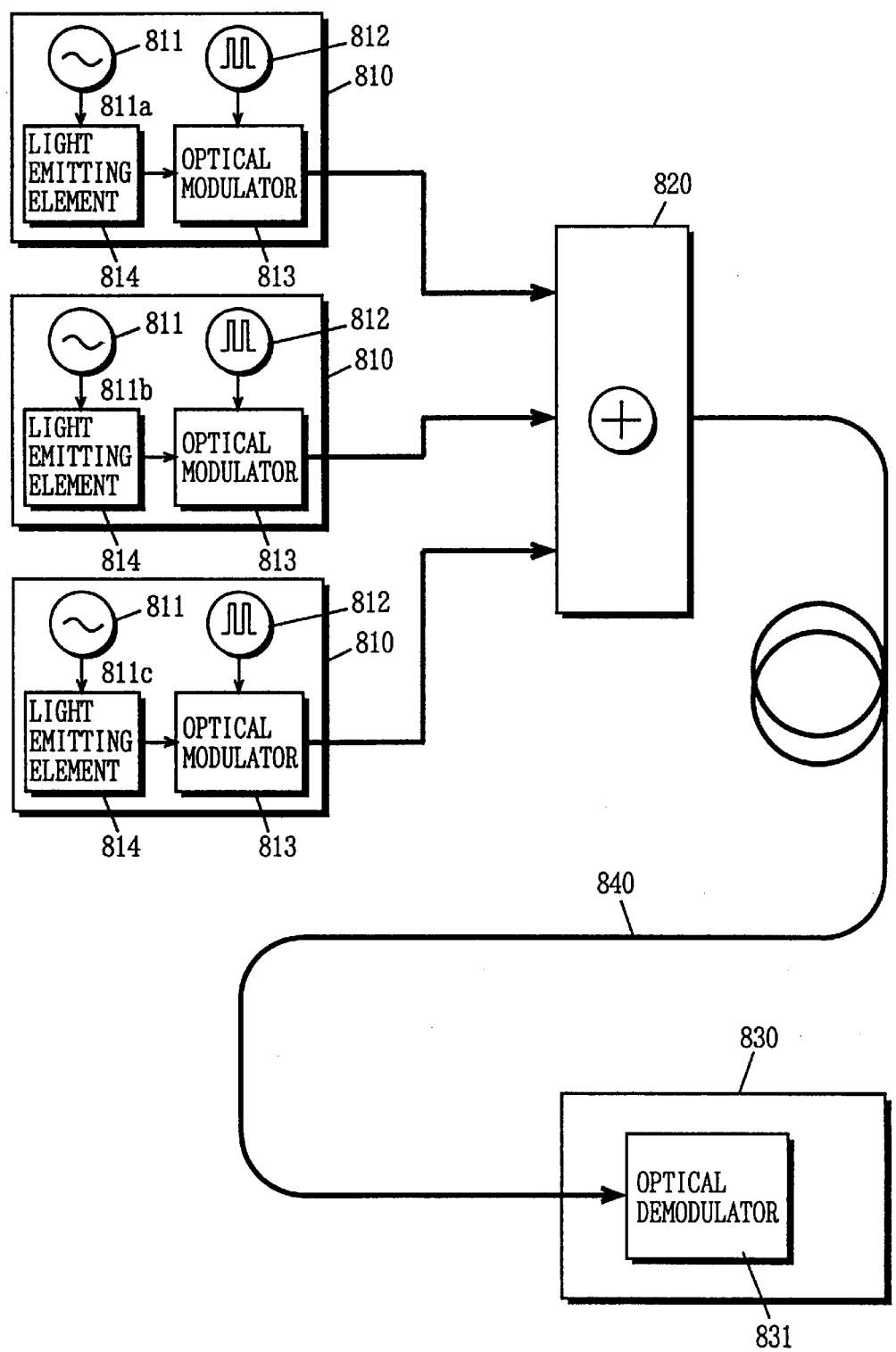
FIG. 8 is a block diagram showing the construction of an optical transmission system according to a second embodiment of the present invention.

FIG. 8 is a block diagram showing the construction of an optical transmission system according to a second embodiment of the present invention. In FIG. 8, the optical transmission system comprises a plurality of optical transmission devices 810 for respectively generating light signals intensity-modulated, an optical coupler 820 for multiplexing the light signals generated by the respective transmission terminals 810, an optical fiber 840 for transmitting a light signal obtained by the multiplexing which is outputted from the optical coupler 820, and an optical receiving device 830 for demodulating the received light signal. Although the optical transmission devices 810 at three stations are illustrated by way of example in FIG. 8, the number of optical transmission devices to be connected is not limited to the same.

Each of the optical transmission devices 810 comprises a signal source 811, a pulse signal generation circuit 812, an optical modulator 813, and a light emitting element 814. The light emitting element 814 is composed of a semiconductor laser or the like. The optical modulator 813 is a so-called external optical modulator, and is composed of a waveguide type light intensity modulator using $LiNbO_3$ (lithium niobate) as a material.

Figure 9A:
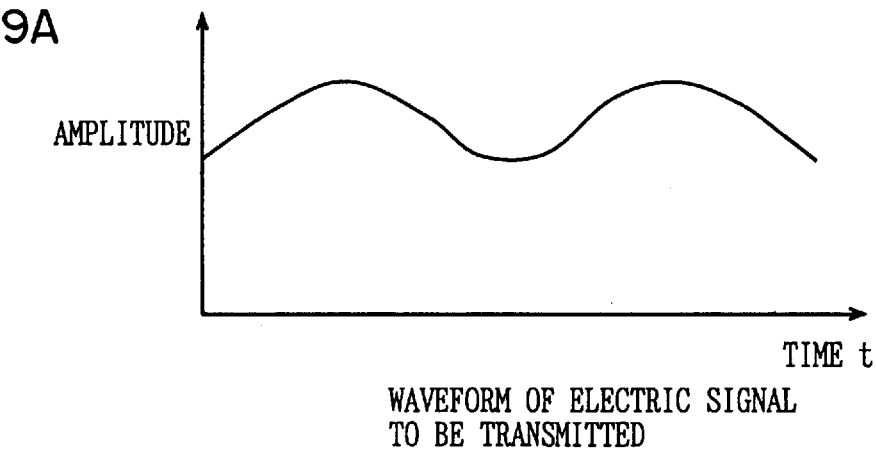
FIG. 9 is a diagram showing the signal waveform and the spectrum distribution in a principal part of the optical transmission system shown in FIG. 8.
Figure 9B:
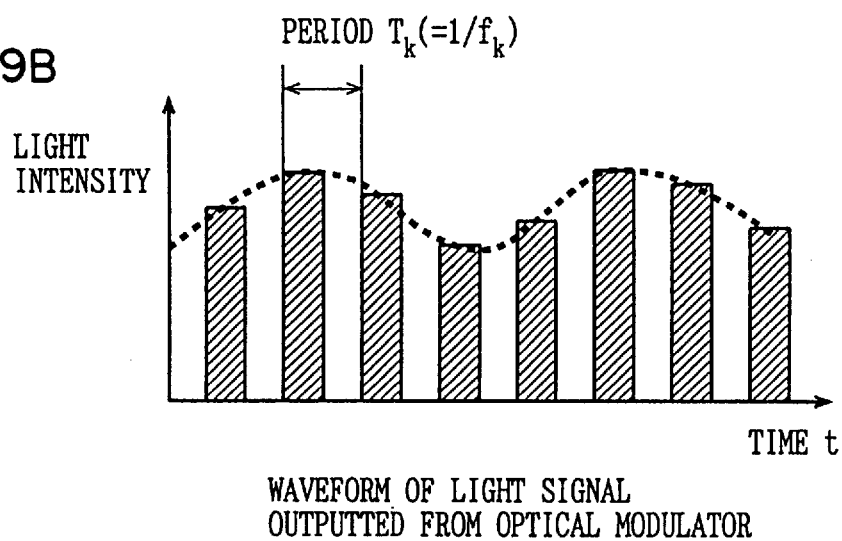

The signal source 811 outputs a transmission signal (an electric signal) including information to be transmitted. In this example, the waveform of an output signal of the signal source 811 is as shown in FIG. 9(a). A transmission signal outputted from the signal source 811 is inputted to the light emitting element 814, and is converted into a light signal. That is, the light emitting element 814 outputs a light signal which is intensity-modulated depending on the amplitude of the inputted signal. The pulse signal generation circuit 812 generates an electric pulse train having a predetermined period $T_k$. Letting $f_{max}$ be the maximum frequency of output signals of the signal sources 811 in all the optical transmission devices 810 existing in the transmission system, and letting $f_k(=1/T_k)$ be the basic frequency of the pulse train generated by the pulse signal generation circuit 812, the basic frequency $f_k$ of the pulse train shall be not less than twice the maximum frequency $f_{max}$. Consequently, crosstalk interference can be prevented from occurring in separating the signals at the time of receiving. The optical modulator 813 intensity-modulates the light signal from the light emitting element 814 by the pulse train from the pulse signal generation circuit 812. The waveform of the light signal outputted from the optical modulator 813 is shown in FIG. 9(b). The light signal which is intensity-modulated by the pulse train is outputted from the optical transmission device 810, and is then inputted to the optical coupler 820. The optical coupler 820 multiplexes a plurality of intensity-modulated light signals outputted from the respective optical transmission devices 810, and transmits a light signal obtained by the multiplexing to the optical fiber 840.

Figure 9C:
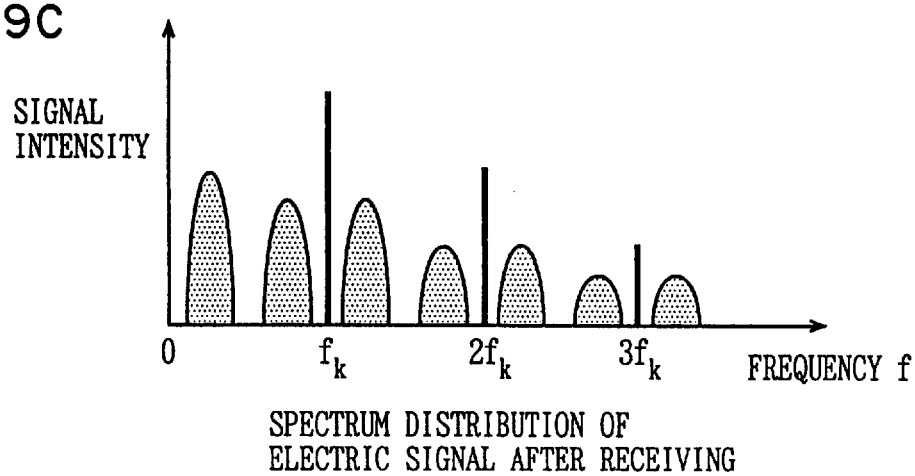

The optical receiving device 830 includes an optical demodulator 831. The optical demodulator 831 converts the light signal from the optical fiber 840 into an electric signal, to reproduce the original transmission signal. FIG. 9(c) illustrates the spectrum distribution of an electric signal obtained upon converting the light signal shown in FIG. 9(b) by a light receiving element (included in the optical demodulator 831), where $f_k$ is the basic frequency of the pulse train. The spectra of the transmission signal shown in FIG. 9(a) are distributed in the vicinity of frequencies "0", "$f_k$", "$2f_k$" and "$3f_k$".

Description is now made of a method of separating, selecting and demodulating the signals from the respective optical transmission devices 810 shown in FIG. 8. The occupied frequency bands of input signals 811a, 811b and 811c generated by the signal sources 811 in the respective optical transmission devices 810 shall be previously so set as not to be overlapped with each other.

Figure 10:
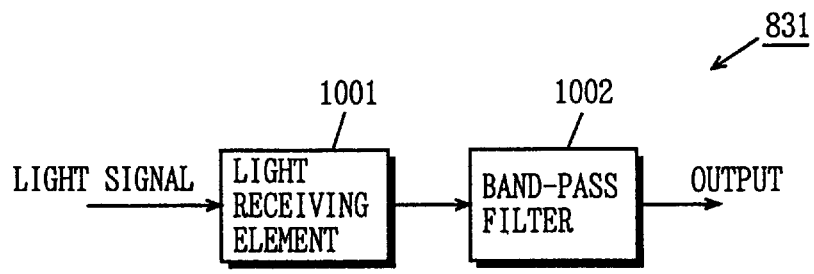
FIG. 10 is a block diagram showing an example of the construction of an optical receiving device in the optical transmission system shown in FIG. 8.
Figure 11:
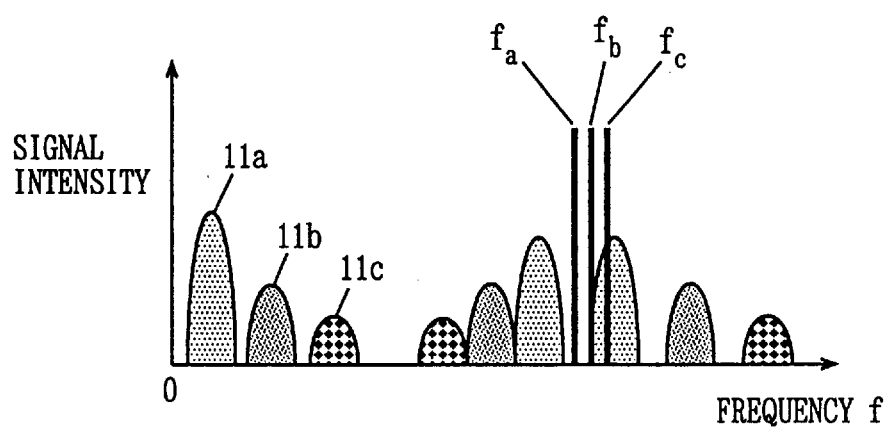
FIG. 11 is a diagram showing the spectrum distribution of an electric signal in the optical receiving device shown in FIG. 10.

One example of the construction of the optical demodulator 831 is shown in FIG. 10. In FIG. 10, a light receiving element 1001 converts the received light signal into an electric signal. The spectrum distribution of the electric signal at this time is illustrated in FIG. 11. In FIG. 11, $f_a$, $f_b$ and $f_c$ are respectively the basic frequencies of pulse trains in the respective optical transmission devices 810. A band-pass filter 1002 extracts only a desired signal out of the signals 811a, 811b and 811c distributed in a base band.

The basic frequencies $f_a$, $f_b$ and $f_c$ of the pulse trains generated by the pulse signal generation circuits 812 in the respective optical transmission devices 810 may be different or may be the same.

As described in the foregoing, in the second embodiment, the light signal (which is intensity-modulated depending on the transmission signal) outputted from the light emitting element 814 in each of the optical transmission devices 810 is further intensity-modulated by the pulse train in the optical modulator 812. The reason why the peak value of beat noise produced after the light signal is received by the optical demodulator 831 is reduced by performing such double modulation will be described in the following.

Figure 12A:
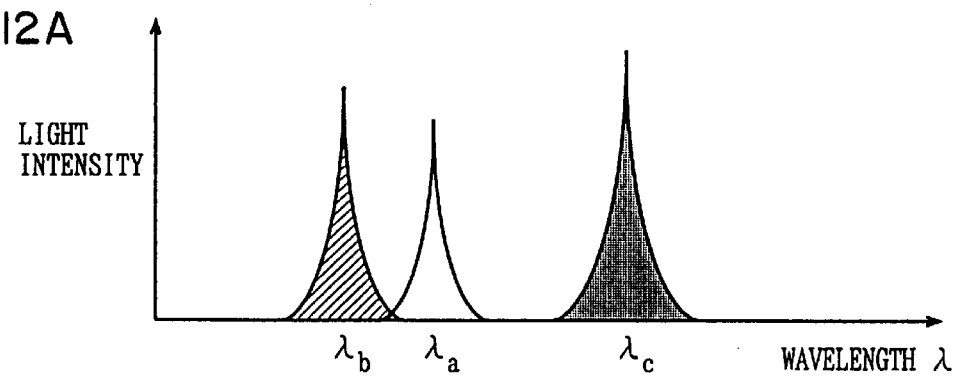
FIG. 12 is a diagram showing the difference in the spectrum distribution of a light signal between a case where modulation is performed by a pulse train and a case where no modulation is performed.
Figure 12B:
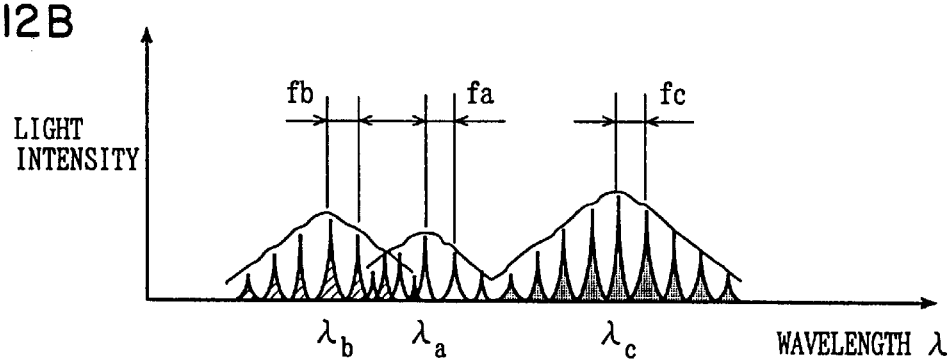

In FIG. 8, the central wavelengths of the light signals, which are not modulated, of the three light emitting elements 814 in the respective optical transmission devices 810 are respectively taken as $\lambda_a$, $\lambda_b$ and $\lambda_c$. The spectrum distribution of the light signals in the optical receiving device 830 in a case where the optical modulators 813 in all the optical transmission devices 810 are brought into a through state without being operated is illustrated in FIG. 12(a). Further, the spectrum distribution of the light signal in the optical receiving device 830 in a case where the optical modulators 813 in all the optical transmission devices 810 are operated, and the light signals from the respective light emitting elements 814 are intensity-modulated by the pulse trains is illustrated in FIG. 12(b). As can be seen from FIG. 12, the light signal from each of the light emitting elements 814 is intensity-modulated again by the pulse train, whereby the spectrum distribution of each of the light signals is discretized into an optical frequency which is separated from the center optical frequency by an integral multiple of the basic frequency $f_k$ (where k; a, b, c) of the pulse train, whereby the peak value of each of light spectra is decreased. Since the peak value of beat noise produced after receiving is proportional to the peak value of the light spectra, the peak value of the beat noise is decreased by further intensity-modulating the light signal by the pulse train. The spectrum distribution of the light signal further expands by methods such as a method of shortening the period T of the pulse train and a method of decreasing the pulse width in the pulse train, whereby the peak value of the beat noise is further decreased. Consequently, the SNR can be further improved.

Although in the above-mentioned second embodiment, the optical transmission device 810 comprises a single signal source 811 and a single pulse signal generation circuit 812, it may comprise a plurality of signal sources 811.

Although in the second embodiment, a waveguide type light intensity modulator using $LiNbO_3$ as a material is used as the optical modulator 813, a light absorption type device, a waveguide switching type light switch, an optical COM generator (see Japanese Patent Laid-Open No. 58386/1995, for example), and the like may be used.

(Third Embodiment)

Figure 13:
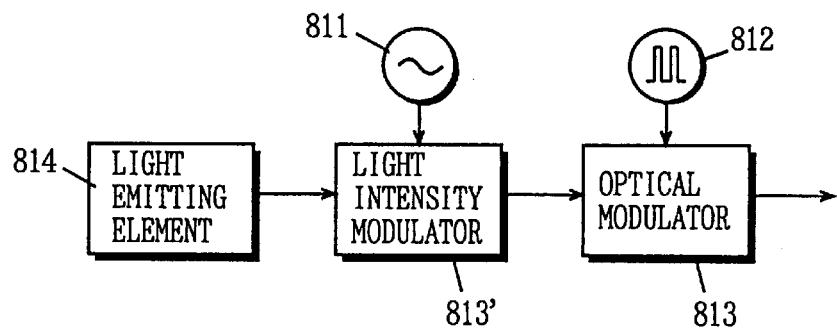
FIG. 13 is a block diagram showing the construction of an optical transmission device used in an optical transmission system according to a third embodiment of the present invention.

FIG. 13 is a block diagram showing the construction of an optical transmission device used in an optical transmission system according to a third embodiment of the present invention. The construction of the entire system may be the same as that in the second embodiment, and comprises a plurality of optical transmission devices 810, an optical coupler 820, an optical fiber 840, and an optical receiving device 830, similarly to that shown in FIG. 8. That is, the optical transmission system according to the present embodiment differs from that in the second embodiment in the construction of the optical transmission device 810.

The above-mentioned second embodiment is so constructed that the transmission signal from the signal source 811 is inputted to the light emitting element 814, and is directly intensity-modulated by the light emitting element 814. On the other hand, the optical transmission device in the third embodiment is so constructed that a transmission signal from a signal source 811 is inputted to a light intensity modulator 813', and a light signal from a light emitting element 814 is externally intensity-modulated by the transmission signal from the signal source 811. The light intensity modulator 813' in this case may be used as an optical modulator 813, or may be independently provided. When the light intensity modulator 813' is used as the optical modulator 813, an output signal from the signal processing circuit 113 shown in FIG. 1 having the transmission signal from the signal source 811 and a pulse train from a pulse signal generation circuit 812 as its input signals is fed to the optical modulator 813.

In the third embodiment, the effect of reducing beat noise is the same as that in the second embodiment.

(Fourth Embodiment)

Figure 14:
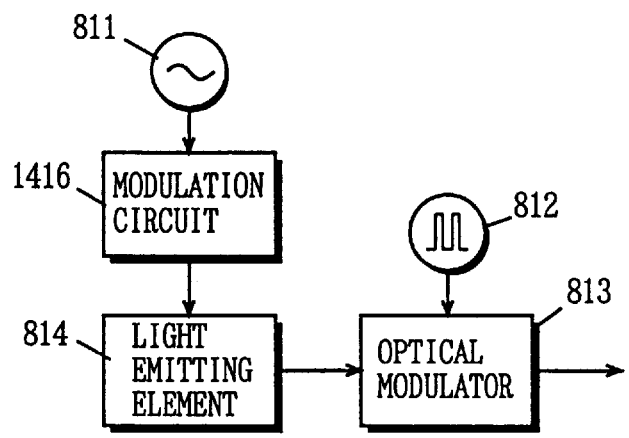
FIG. 14 is a block diagram showing the construction of an optical transmission device used in an optical transmission system according to a fourth embodiment of the present invention.

FIG. 14 is a block diagram showing the construction of an optical transmission system according to a fourth embodiment of the present invention. The entire system may be the same in construction as that in the second embodiment, and comprises a plurality of optical transmission devices 810, an optical coupler 820, an optical fiber 840, and an optical receiving device 830, similarly to that shown in FIG. 8. That is, the optical transmission system according to the present embodiment differs from that in the second embodiment in the construction of the optical transmission device 810.

In FIG. 14, the optical transmission device according to the present embodiment comprises a signal source 811, a modulation circuit 1416, a pulse signal generation circuit 812, an optical modulator 813, and a light emitting element 814. The light emitting element 814 is composed of a semiconductor laser or the like.

A transmission signal (an electric signal including information to be transmitted) outputted from the signal source 811 is inputted to the modulation circuit 1416. The modulation circuit 1416 amplitude-modulates, frequency-modulates or pulse-modulates a sub-carrier having a frequency $f_s$ and outputs the sub-carrier depending on the transmission signal fed from the signal source 811. The frequency $f_s$ of the sub-carrier used in the modulation circuit 1416 shall have a value which differs for each optical transmission device. A modulation signal outputted from the modulation circuit 1416 is inputted to the light emitting element 814. The light emitting element 814 outputs a light signal which is intensity-modulated depending on the variation in the amplitude of the inputted modulation signal. The pulse signal generation circuit 812 generates a pulse train having a predetermined period $T_k$. Letting $f_{s(max)}$ be the maximum frequency out of the frequencies $f_s$ of sub-carriers in the modulation circuits 1416 in all the optical transmission devices, and letting $f_k(=1/T_k)$ be the basic frequency of the pulse train outputted from the pulse signal generation circuit 812, the basic frequency $f_k$ of the pulse train shall be not less than twice the maximum frequency $f_{s(max)}$. The optical modulator 813 intensity-modulates the light signal from the light emitting element 814 by the inputted pulse train.

Although in the second embodiment, the occupied frequency bands of the transmission signals from the signal sources 811 must be previously so set as to differ between the optical transmission devices 810, the fourth embodiment differs from the second embodiment in that the occupied frequency bands of the transmission signals from the signal sources 811 may be so set as to be overlapped with each other between the optical transmission devices in the fourth embodiment.

In the fourth embodiment, a method of demodulating a received signal on the receiving side is approximately the same as that in the above-mentioned second embodiment. Specifically, in FIG. 10, the light signal is converted into the electric signal by the light receiving element 1001. Only a desired signal out of the signals distributed in the base band is extracted by the band-pass filter 1002. The extracted signal is demodulated to reproduce the original signal because it is a signal which is amplitude-modulated, frequency-modulated or pulse-modulated.

Furthermore, in the above-mentioned fourth embodiment, the effect of reducing beat noise is the same as that in the second embodiment.

(Fifth Embodiment)

Figure 15:
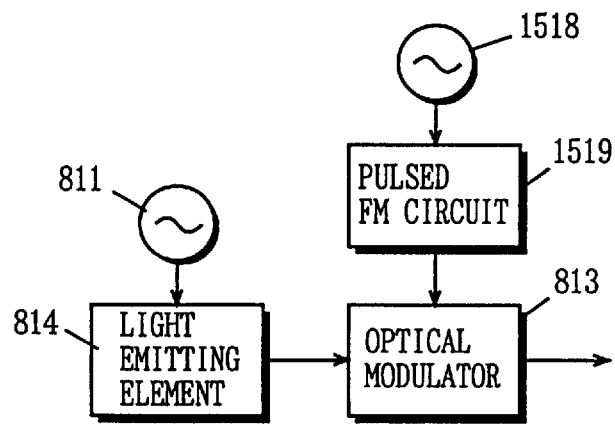
FIG. 15 is a block diagram showing the construction of an optical transmission device used in an optical transmission system according to a fifth embodiment of the present invention.

FIG. 15 is a block diagram showing the construction of an optical transmission device used in an optical transmission system according to a fifth embodiment of the present invention. The entire system may be the same in construction as that of the second embodiment, and comprises a plurality of optical transmission devices 810, an optical coupler 820, an optical fiber 840, and an optical receiving device 830, similarly to that shown in FIG. 8. That is, the optical transmission system according to the present embodiment differs from that in the second embodiment in the construction of the optical transmission device 810.

In FIG. 15, the optical transmission device according to the present embodiment comprises a first signal source 811, a second signal source 1518, a pulsed FM circuit 1519, an optical modulator 813, and a light emitting element 814. The light emitting element 814 is composed of a semiconductor laser or the like.

Figure 16A:
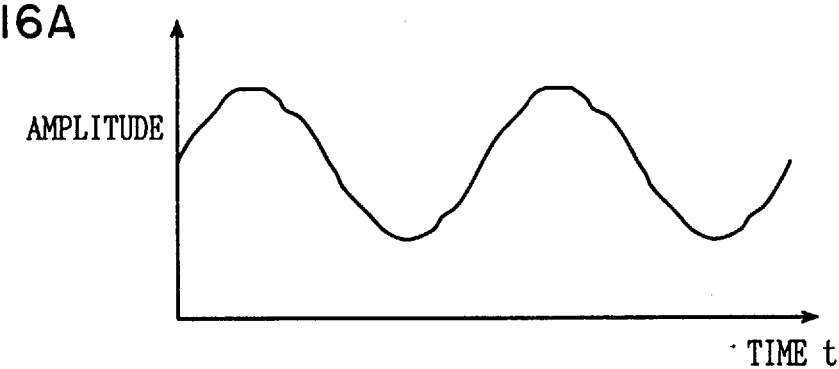
FIG. 16 is a diagram showing the waveform of a signal in a principal part of the optical transmission device of the construction shown in FIG. 15.
Figure 16B:
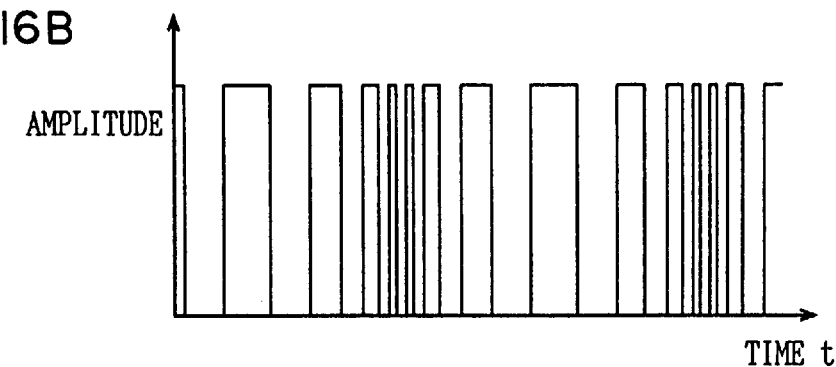
Figure 16C:
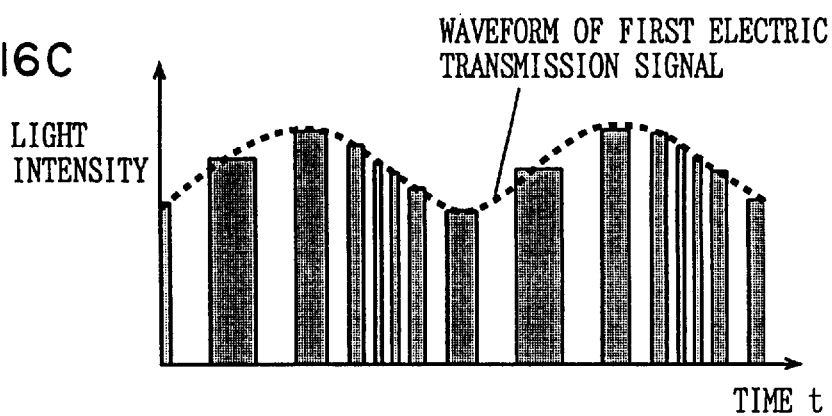

The first signal source 811 outputs a transmission signal (an electric signal including information to be transmitted). The transmission signal is inputted to the light emitting element 814. The light emitting element 814 outputs a light signal which is intensity-modulated depending on the variation in the amplitude of the fed transmission signal. As the waveform of an output signal of the second signal source 1518, various waveforms such as the waveforms of a sine wave, a square wave, and a triangular wave can be employed. Further, the frequency thereof may not be predetermined. That is, the output signal of the second signal source 1518 may be a random wave. However, the occupied frequency band of the output signal of the second signal source 1518 must be so set as not to be overlapped with the occupied frequency band of the output signal of the first signal source 811. The waveform of the output signal of the second signal source 1518 shall be a sine wave having a predetermined frequency, as shown in FIG. 16(*a*), for convenience. The pulsed FM circuit 1519 pulsed frequency-modulates a sub-carrier having a frequency $f_p$ and outputs the sub-carrier depending on the variation in the amplitude of the output signal of the second signal source 1518. The waveform of the output signal is shown in FIG. 16(*b*). The optical modulator 813 intensity-modulates the light signal from the light emitting element 814 by the output signal of the pulsed FM circuit 1519. The waveform of the light signal outputted from the optical modulator 813 is shown in FIG. 16(*c*).

In the above-mentioned fifth embodiment, a method of demodulating a received signal on the receiving side is the same as that in the above-mentioned second embodiment. Specifically, in FIG. 10, the light signal is converted into an electric signal by the light receiving element 1001. Only a desired signal out of signals 811*a*, 811*b* and 811*c* distributed in a base band is extracted by the band-pass filter 1002. The occupied frequency bands of the input signals 811*a*, 811*b* and 811*c* generated by the signal sources in the respective optical transmission devices 811 are previously so set as not to be overlapped with each other.

Although in the second embodiment, the period of the pulse train is predetermined, the period and the width of a pulse train in a pulsed FM signal change depending on a particular signal. The pulsed FM signal has more frequency components than those of the pulse train having a predetermined period. Therefore, the spectrum distribution of a light signal which is intensity-modulated by the pulsed FM signal is made wider than that of a light signal which is intensity-modulated by the pulse train having a predetermined period, whereby beat noise can be further reduced.

In the above-mentioned fifth embodiment, the frequency $f_p$ of the sub-carrier signal of the pulsed FM circuit 1519 may differ for each optical transmission device. In a case where the frequencies $f_p$ of the sub-carrier signals differ, the peak value of the beat noise is reduced because the shapes of the spectrum distributions of the light signals outputted from the respective optical transmission devices differ. Further, even in a case where the occupied frequency band of the signal from the second signal source 1518 differs for each optical transmission device, the peak value of the beat noise is reduced because the shapes of the spectrum distributions of the light signals outputted from the optical transmission devices differ.

(Sixth Embodiment)

The construction of an optical transmission device used in an optical transmission system according to a sixth embodiment is apparently the same as the construction of the optical transmission device 801 (see FIG. 8) used in the second embodiment except for the set contents. As described above, in the second embodiment, the occupied frequency bands of the input signals 811*a*, 811*b* and 811*c* generated by the signal sources 811 in the respective optical transmission devices 810 are previously so set as not to be overlapped with each other. The basic frequencies $f_a$, $f_b$ and $f_c$ of the pulse trains generated by the pulse signal generation circuits 812 may be different or the same. On the other hand, in the optical transmission system in the sixth embodiment, the basic frequencies $f_a$, $f_b$ and $f_c$ of pulse trains generated by pulse signal generation circuits 812 in the respective optical transmission devices are so set as to differ. Further, letting $f_{sa(max)}$, $f_{sb(max)}$ and $f_{sc(max)}$ be the maximum frequencies in the occupied frequency bands of input signals 811*a*, 811*b* and 811*c* produced by signal sources 811, $f_a$, $f_b$ and $f_c$ are so set as to satisfy the conditions expressed by the following equations (8) to (10):

$$|f_a-f_b|>f_{sa(max)}-f_{sb(max)} \quad (8)$$

$$|f_b-f_c|>f_{sb(max)}-f_{sc(max)} \quad (9)$$

$$|f_c-f_a|>f_{sc(max)}-f_{sa(max)} \quad (10)$$

The occupied frequency bands of the input signals 811*a*, 811*b* and 811*c* may be different or the same.

Figure 17:
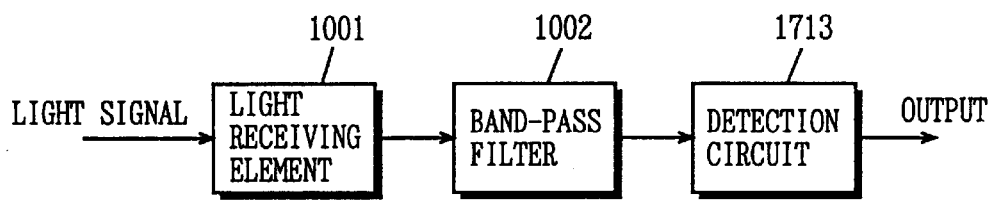
FIG. 17 is a block diagram showing an example of the construction of an optical receiving device suitable for an optical transmission device used in an optical transmission system according to a sixth embodiment of the present invention.
Figure 18:
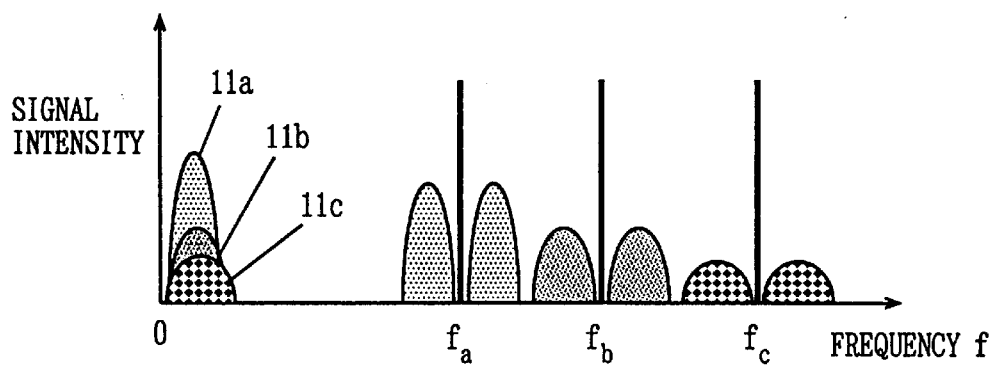
FIG. 18 is a diagram showing the spectrum distribution of an electric signal outputted from a light receiving element shown in FIG. 17.

An example of the construction of an optical demodulator 31 suitable for the present embodiment is shown in FIG. 17. In FIG. 17, a light receiving element 1001 converts a received light signal into an electric signal. The spectrum distribution of the electric signal at this time is illustrated in FIG. 18. A band-pass filter 1002 extracts only a signal in the vicinity of any one of the frequencies $f_a$, $f_b$ and $f_c$. A detection circuit 1713 performs synchronous detection or envelop detection, to obtain a desired signal. The effect of reducing beat noise obtained in the present embodiment is the same as that in the second embodiment.

(Seventh Embodiment)

Figure 19:
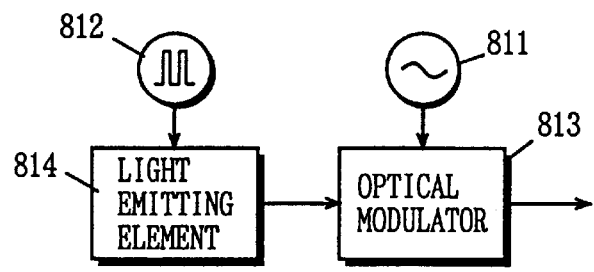
FIG. 19 is a block diagram showing the construction of an optical transmission device used in an optical transmission system according to a seventh embodiment of the present invention.

FIG. 19 is a block diagram showing the construction of an optical transmission device used in an optical transmission system according to a seventh embodiment of the present invention. The entire system may be the same in construction as that in the second embodiment, and comprises a plurality of optical transmission devices 810, an optical coupler 820, an optical fiber 840, and an optical receiving device 830, similarly to that shown in FIG. 8. That is, the optical transmission system according to the present embodiment differs from that in the second embodiment in the construction of the optical transmission device 810.

In the above-mentioned second to sixth embodiments, the signal from the signal source 811 is converted into a light intensity modulation signal by the light emitting element 814, and the light intensity modulation signal is further intensity-modulated by the pulse train. On the other hand, in the seventh embodiment, a light signal in a pulse train shape having predetermined peak power is outputted from a light emitting element 814, and the light signal in a pulse train shape is intensity-modulated in an optical modulator 813 depending on the amplitude of a transmission signal from a signal source 811. A demodulating method after transmitting the light signal and an effect to be obtained in the seventh embodiment are the same as those in the second to sixth embodiments.

In the construction shown in FIG. 19, a pulse signal from a pulse signal generation circuit 812 is inputted to the light emitting element 814, and the luminous intensity of the light emitting element 814 is changed depending on the amplitude of the signal, to obtain a light signal in a pulse train shape. On the other hand, a self-oscillation type semiconductor laser may be used as the light emitting element 814. Specifically, the self-oscillation type semiconductor laser has the advantage that the luminous power of a light signal outputted from the laser varies in a pulse shape in the period of several GHz only by injecting a DC current. Consequently, the pulse signal generation circuit 812 need not be provided, whereby the circuit configuration can be further simplified.

(Eighth Embodiment)

Figure 20:
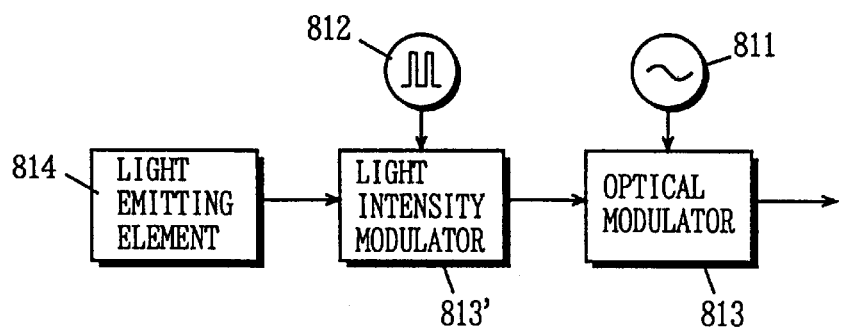
FIG. 20 is a block diagram showing the construction of an optical transmission device used in an optical transmission system according to an eighth embodiment of the present invention.

Although in the above-mentioned seventh embodiment, the pulse signal from the pulse signal generation circuit 812 is inputted to the light emitting element 814, and is directly intensity-modulated by the light emitting element 814, an optical transmission device in the present embodiment may be so constructed that a pulse signal from a pulse signal generation circuit 812 is inputted to a light intensity modulator 813', and a light signal from a light emitting element 814 is externally intensity-modulated, as shown in FIG. 20. The light intensity modulator 813' in this case may be also used as the optical modulator 813, or may be independently provided. When the light intensity modulator 813' is also used as the optical modulator 813, an output signal from the signal processing circuit 113 shown in FIG. 1 having a signal pulse from a signal source 811 and the pulse train from the signal generation circuit 812 as its input signals is fed to the optical modulator 813.

(Ninth Embodiment)

Figure 21:
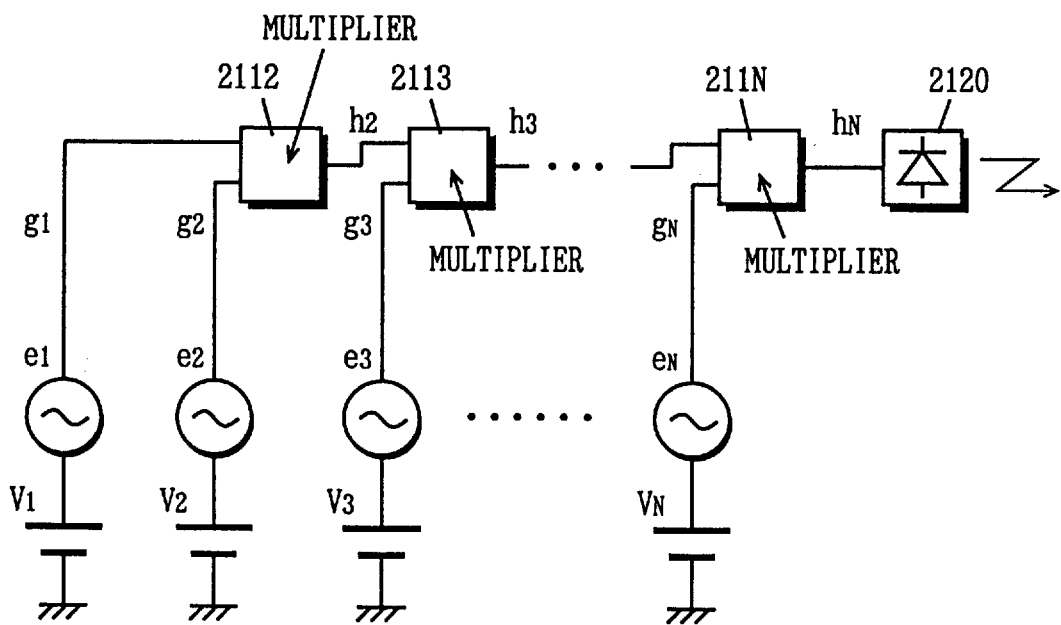
FIG. 21 is a block diagram showing the construction of an optical transmission device used in an optical transmission system according to a ninth embodiment of the present invention.

FIG. 21 is a block diagram showing the construction of an optical transmission device used in an optical transmission system according to a ninth embodiment of the present invention. In FIG. 21, the optical transmission device comprises multipliers 2112 to 211N and a semiconductor laser 2120. In FIG. 21, $e_1$ to $e_N$ denote RF signals, and $V_1$ to $V_N$ denote direct current signals. $g_1$ to $g_N$ respectively denote signals obtained by adding the RF signals $e_1$ to $e_N$ and the direct current signals $V_1$ to $V_N$ together, and are referred to as element signals herein. Further, $h_2$ to $h_N$ respectively denote output signals of the multipliers 2112 to 211N, and are referred to as cumulative signals herein.

In this example, the RF signals $e_1$ to $e_N$ shall be sine waves respectively having frequencies $f_1$ to $f_N$, and given by the following equations $(11_1)$ to $(11_N)$ $$e_1(t)=E_{01} \cdot \cos(2\pi f_1 t + \phi_1) \quad (11_1)$$

$$e_2(t)=E_{02} \cdot \cos(2\pi f_2 t + \phi_2) \quad (11_2)$$

$$e_N(t)=E_{0N} \cdot \cos(2\pi f_N t + \phi_N) \quad (11_N)$$

In the foregoing equations $(11_1)$ to $(11_N)$, $\phi_1$ to $\phi_N$ denote the phases of the respective RF signals. The element signals $g_1$ to $g_N$ are respectively given by the following equations $(12_1)$ to $(12_N)$:

$$g_1(t)=V_1\{1+m_{X1} \cdot \cos(2\pi f_1 t + \phi_1)\} \quad (12_1)$$

$$g_2(t)=V_2\{1+m_{X2} \cdot \cos(2\pi f_2 t + \phi_2)\} \quad (12_2)$$

$$g_N(t)=V_N\{1+m_{XN} \cdot \cos(2\pi f_N t + \phi_N)\} \quad (12_N)$$

In the foregoing equations $(12_1)$ to $(12_N)$, $m_{X1}$ to $m_{XN}$ are given by the following equations $(13_1)$ to $(13_N)$:

$$m_{X1}=E_{01}/V_1 \quad (13_1)$$

$$m_{X2}=E_{02}/V_2 \quad (13_2)$$

$$m_{XN}=E_{0N}/V_N \quad (13_N)$$

The element signals $g_1$ and $g_2$ are inputted to the multiplier 2112. The cumulative signal $h_2$ which is an output of the multiplier 2112 is given by the following equation (14):

$$\begin{aligned} h_2 &= g_1 \cdot g_2 \\ &= V_1 \cdot V_2 \cdot \{1 + m_{X1} \cdot \cos(2\pi f_1 t + \phi_1)\} \cdot \\ &\quad \{1 + m_{X2} \cdot \cos(2\pi f_2 t + \phi_2)\} \end{aligned} \quad (14)$$

Figure 22A:
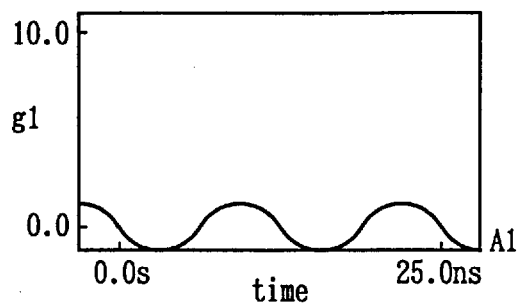
FIG. 22 is a diagram showing the signal waveform of each of portions of the optical transmission device shown in FIG. 21.
Figure 22B:
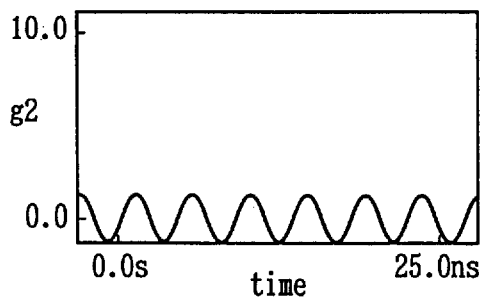

The multiplier 2112 can be specifically realized by a mixer or the like. Examples of the time waveforms of the element signals $g_1$ and $g_2$ are respectively illustrated in FIGS. 22(a) and 22(b), where $V_1=V_2=1$ $m_{X1}=m_{X2}=1$ $f_1=100$ [MHz]

$f_2=280$ [MHz]

$\phi_1=\phi_2=0$

Figure 22C:
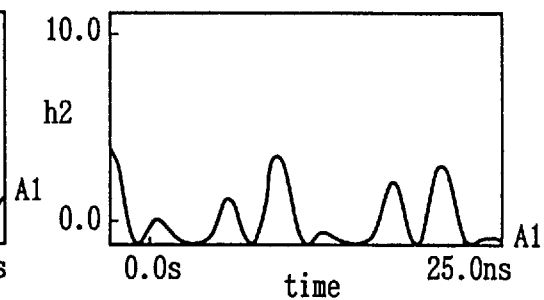

FIG. 22(c) indicate s the time waveform of the cumulative signal $h_2$. The minimum value, the maximum value and the average value of the cumulative signal $h_2$ are respectively 0, 4 and 1.

The cumulative signal $h_2$ and the element signal $g_3$ are inputted to the multiplier 2113. The cumulative signal $h_3$ which is an output of the multiplier 2113 is given by the following equation (15):

$$h_3 = h_2 \cdot g_3 \quad (15)$$
$$= g_1 \cdot g_2 \cdot g_3$$
$$V_1 \cdot V_2 \cdot V_3 \cdot \{1 + m_{X1} \cdot \cos(2\pi f_1 t + \phi_1)\} \cdot$$
$$\{1 + m_{X2} \cdot \cos(2\pi f_2 t + \phi_2)\} \cdot \{1 + m_{X3} \cdot \cos(2\pi f_3 t + \phi_3)\}$$

Figure 22D:
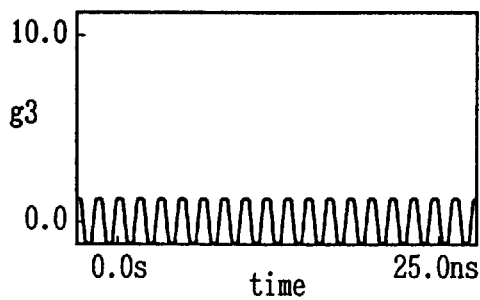
Figure 22E:
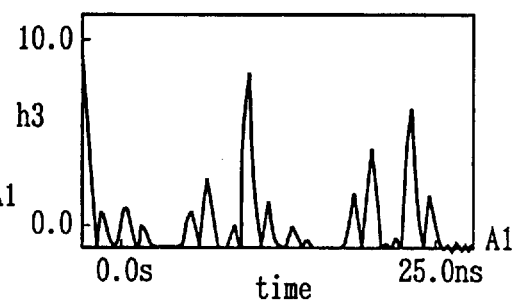

An example of the time waveform of the element signal $g_3$ is illustrated in FIG. 22(d), where
$V_3=1$
$m_{X3}=1$
$f_3=760$ [MHz]
$\phi_3=0$ The time waveform of the cumulative signal $h_3$ is as illustrated in FIG. 22(e). The minimum value, the maximum value and the average value of the cumulative signal $h_3$ are respectively 0, 8 and 1.

The cumulative signal $h_N$ which is an output of the multiplier 211N is finally given by the following equation (16) by performing an operation of successively multiplying the element signals together:

$$h_N = g_1 \cdot g_2 \cdot g_3 \ldots \cdot g_N \quad (16)$$
$$V_1 \cdot V_2 \cdot V_3 \ldots \cdot V_N \cdot \{1 + m_{X1} \cdot \cos(2\pi f_1 t + \phi_1)\} \cdot$$
$$\{1 + m_{X2} \cdot \cos(2\pi f_2 t + \phi_2)\} \cdot \{1 + m_{X3} \cdot \cos(2\pi f_3 t + \phi_3)\} \cdot$$
$$\cdot$$
$$\cdot$$
$$\cdot$$
$$\{1 + m_{XN} \cdot \cos(2\pi f_N t + \phi_N)\}$$

In the foregoing equation (16), when the following equations hold, the minimum value, the maximum value and the average value of the cumulative signal $h_N$ are respectively 0, $2^N$ and 1:
$m_{X1}=m_{X2}=m_{X3}=\ldots=m_{XN}=1$
$\phi_1=\phi_2=\phi_3=\ldots=\phi_N=0$
$V_1=V_2=V_3=\ldots=V_N=1$ Even if the number N of element signals is thus increased, the minimum value and the average value of the cumulative signal $h_N$ respectively remain 0 and 1. That is, only the maximum value of $h_N$ is increased.

The cumulative signal $h_N$ is converted into a current signal, and a bias current is added to the current signal, after which a current signal obtained by the addition is inputted to the semiconductor laser 2120. The semiconductor laser 2120 outputs a light signal which is intensity-modulated depending on the inputted current signal. The bias current and a threshold current of the semiconductor laser 2120 are respectively taken as $l_b$ and $l_{th}$, and $V_1 \cdot V_2 \cdot V_3 \ldots V_N$ in the equation (16) are so set as to be $(l_b-l_{th})$. At this time, a light signal $P_s(t)$ outputted from the semiconductor laser 2120 is given by the following equation (17):

$$P_s(t) = P_0\{1 + m_{X1} \cdot \cos(2\pi f_1 t + \phi_1)\} \cdot \quad (17)$$
$$\{1 + m_{X2} \cdot \cos(2\pi f_2 t + \phi_2)\} \cdot$$
$$\{1 + m_{X3} \cdot \cos(2\pi f_3 t + \phi_3)\} \cdot$$
$$\cdot$$
$$\cdot$$
$$\cdot$$
$$\{1 + m_{XN} \cdot \cos(2\pi f_N t + \phi_N)\}$$

In the foregoing equation (17), $P_0$ denotes the time average optical power of the light signal, and is given by the foregoing equation (5). $m_{X1}$ to $m_{XN}$ in the equation (17) are hereinafter referred to as light modulation factors in the RF signals $e_1$ to $e_N$, respectively.

When $\phi_1=\phi_2=\phi_3=\ldots=\phi_N=0$, the minimum value Pmin and the maximum value Pmax of $P_s(t)$ are respectively given by the following equations (18) and (19):

$$Pmin=1-m_{X1} \cdot m_{X2} \cdot m_{X3} \ldots m_{XN} \quad (18)$$

$$Pmax=(1+m_{X1}) \cdot (1+m_{X2}) \cdot (1+m_{X3}) \ldots (1+m_{XN}) \quad (19)$$

If all the light modulation factors $m_{X1}$ to $m_{XN}$ are not more than one, no clipping occurs in the semiconductor laser 2120. Assuming that the average power of the light signal in the prior art is equal to that in the present embodiment, a value obtained by adding the light modulation factors $m_1$ to $m_N$ together must not more than one in order not to cause clipping in the prior art, while the light modulation factors may be not more than one in the present embodiment. That is, when the following equations hold:
$m_1=m_2=\ldots=m_N$
$m_{X1}=m_{X2}=\ldots=m_{XN}$,
the values of $m_k$ (k=1, 2, ..., N) and $m_{Xk}$ (k=1, 2, ..., N) are respectively given by the following equations (20) and (21):

$$m_k \leq 1/N \quad (20)$$

$$m_{Xk} \leq 1 \quad (21)$$

As described in the foregoing, in the present embodiment, it is possible to increase the number of sub-carrier signals or increase the light modulation factor of each of the sub-carrier signals without causing clipping.

Description is now made of the arrangement of the frequencies of the RF signals $e_1$ to $e_N$.

The occupied frequencies of the RF signals $e_1$ to $e_N$ are so set as not to be overlapped with each other. Further, they are so set as not to be overlapped with the respective frequencies of $e_1 \cdot e_2, \ldots, e_1 \cdot e_2 \ldots e_N$ obtained by multiplying the RF signals together. In order to perform such setting, the respective center frequencies $f_1$ to $f_N$ may satisfy the conditions indicated by the following equations (22) to (24) if all the frequency bands of the RF signals $e_1$ to $e_N$ are B[Hz], where $f_1 < f_2 < \ldots < f_N$ and k=3, 4, , N:

$$f_1 > (3/2) \cdot B \quad (22)$$

$$f_2 > 2 \cdot f_1 + (3/2) \cdot B \quad (23)$$

$$f_k \geq 3 \cdot f_{k-1} - f_{k-2} + B/2 \quad (24)$$

FIG. 23 is the results of calculation of $h_3(t)$ in a case where B=40 [MHz], $f_1$=100 [MHz], $f_2$=280 [MHz], and $f_3$=760 [MHz]. The values of $f_1$ to $f_3$ are calculated using the equations (22) to (24). Sine waves on five channels shall exist at 10 [MHz] spacing in the band of each of the RF signals $e_1$, $e_2$ and $e_3$. As can be seen from FIG. 23, components of $e_1 \cdot e_2$, $e_2 \cdot e_3$, $e_3 \cdot e_1$, and $e_1 \cdot e_2 \cdot e_3$ are not overlapped with each of the bands of the signals $e_1$, $e_2$, and $e_3$.

A light signal $P_s(t)$ outputted from the semiconductor laser 2120 is transmitted to a light receiving element (not shown) through an optical transmission line such as an optical fiber. In the optical receiving device, the light signal is converted into a current signal. When the loss of light in the optical transmission line is taken as $\alpha$ [dB], the photoelectric conversion efficiency in the optical receiving device is taken as $\rho$ [A/W], and $P_s(t)$ shall be given by the following equation (17), a current signal $i_R(t)$ after the conversion is given by the following equation (25):

$$i_R(t) = \eta \cdot 10^{(\alpha/10)} \cdot \hat{P}_s(t) \tag{25}$$

$$= \eta \cdot 10^{(\alpha/10)} \cdot P_0 \cdot \{1 + m_{X1} \cdot \cos(2\pi f_1 t + \phi_1)\} \cdot$$

$$\{1 + m_{X2} \cdot \cos(2\pi f_2 t + \phi_2)\} \cdot \{1 + m_{X3} \cdot \cos(2\pi f_3 t + \phi_3)\} \cdot$$

$$\cdot$$
$$\cdot$$
$$\cdot$$

$$\{1 + m_{XN} \cdot \cos(2\pi f_N t + \phi_N)\}$$

$$= \eta \cdot 10^{(\alpha/10)} \cdot P_0 \cdot$$

$$\{1 + m_{X1} \cdot \cos(2\pi f_1 t + \phi_1) + m_{X2} \cdot \cos(2\pi f_2 t + \phi_2) +$$

$$m_{X3} \cdot \cos(2\pi f_3 t + \phi_3) + \ldots + m_{XN} \cdot \cos(2\pi f_N t + \phi_N) +$$

$$m_{X1} \cdot \cos(2\pi f_1 t + \phi_1) \cdot m_{X2} \cdot \cos(2\pi f_2 t + \phi_2) +$$

$$m_{X2} \cdot \cos(2\pi f_2 t + \phi_2) \cdot m_{X3} \cdot \cos(2\pi f_3 t + \phi_3) + \ldots \}$$

As expressed by the foregoing equation (25), a desired signal can be obtained by extracting a signal in the vicinity of any one of the frequencies $f_1$ to $f_N$ using a band-pass filter. That is, the optical receiving device used for the optical transmission system described in the prior art is applicable to the present embodiment without any modification.

Although in FIG. 21, the RF signals $e_1$ to $e_N$ are sine waves respectively having frequencies $f_1$ to $f_N$, each of the RF signals may be composed of a plurality of modulation signals which differ in the carrier frequency. The value of the square root corresponding to the sum of squares of the amplitude values of the respective modulation signals shall be not more than the magnitude of a direct current signal. The advantage of the construction is that since one element signal is generated with respect to a plurality of modulation signals, the band of a cumulative signal can be narrowed, as compared with that in a case where the element signal is generated with respect to each of the modulation signals.

(Tenth Embodiment)

Figure 24:
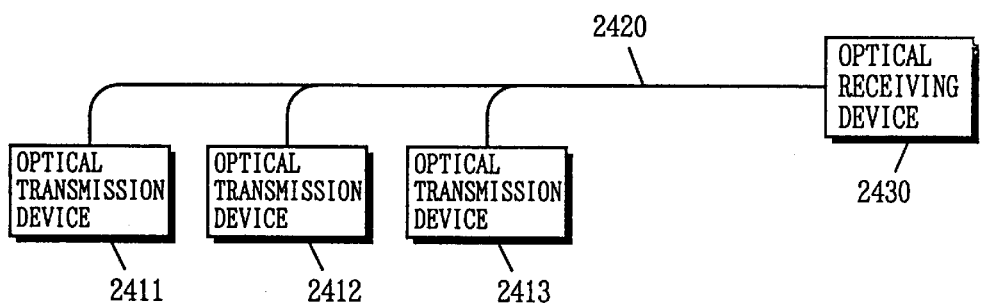
FIG. 24 is a block diagram showing the construction of an optical transmission system according to a tenth embodiment of the present invention.

FIG. 24 is a block diagram showing the construction of an optical transmission system according to a tenth embodiment of the present invention. In FIG. 24, the optical transmission system according to the present embodiment comprises optical transmission devices 2411 to 2413, a optical transmission line 2420, and an optical receiving device 2430. The optical transmission devices 2411 to 2413 respectively output light signals to be transmitted. The light signals are multiplexed by an optical coupler or the like (not shown), after which a light signal obtained by the multiplexing is transmitted to the optical receiving device 2430 through the optical transmission line 2420. The optical receiving device 2430 receives the transmitted light signal and demodulates the received light signal.

The circuit configurations of the optical transmission devices 2411 to 2413 are respectively the same as that of the above-mentioned optical transmission device in the ninth embodiment (see FIG. 21). In the present embodiment, the number of RF signals used in each of the optical transmission devices 2411 to 2413 shall be two. Let $f_{11}$ and $f_{12}$ (where $f_{11}<f_{12}$) be the respective center frequencies of two RF signals $e_1$ and $e_2$ in the optical transmission device 2411, $f_{21}$ and $f_{22}$ (where $f_{21}<f_{22}$) be the respective center frequencies of two RF signals $e_1$ and $e_2$ in the optical transmission device 2412, and $f_{31}$ and $f_{32}$ (where $f_{31}<f_{32}$) be the respective center frequencies of two RF signals $e_1$ and $e_2$ in the optical transmission device 2413. Further, the optical transmission devices 2411, 2412 and 2413 shall include information to be sent in the respective RF signals $e_2$.

Figure 25:
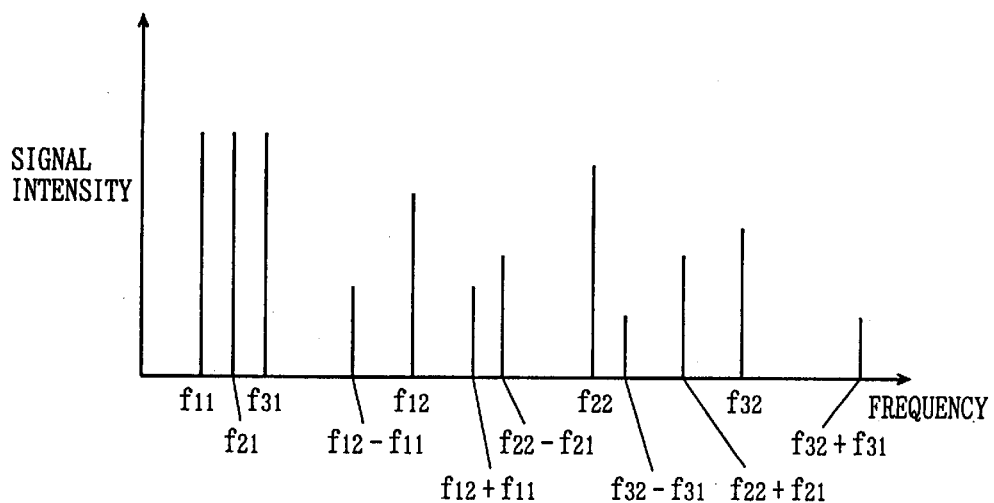
FIG. 25 is a diagram showing the spectrum distribution of an output signal in a principal part of the optical transmission system according to the tenth embodiment of the present invention.

FIG. 25 illustrates the arrangement of the respective frequencies of intensity modulation components in light signals outputted from the optical transmission devices 2411, 2412 and 2413. Referring to FIG. 25, let $f_{11}$, $f_{12}$, $f_{12}-f_{11}$, and $f_{12}+f_{11}$ be respectively the frequencies of the intensity modulation components in the light signal outputted form the optical transmission device 2411. Further, let $f_{21}$, $f_{22}$, $f_{22}-f_{21}$, and $f_{22}+f_{21}$ be respectively the frequencies of the intensity modulation components in the light signal outputted from the optical transmission device 2412. In addition, let $f_{31}$, $f_{32}$, $f_{32}-f_{31}$, and $f_{32}+f_{31}$ be respectively the frequencies of the intensity modulation components in the light signal outputted form the optical transmission device 2413.

$f_{11}$, $f_{21}$ and $f_{31}$ out of the frequencies shall differ from each other. Further, $f_{11}$, $f_{21}$ and $f_{31}$ shall not be overlapped with $f_{12}$, $f_{12}-f_{11}$, $f_{12}+f_{11}$, $f_{22}$, $f_{22}-f_{21}$, $f_{22}+f_{21}$, $f_{32}$, $f_{32}-f_{31}$, and $f_{32}+f_{31}$. $f_{12}$, $f_{22}$ and $f_{32}$ may be the same frequency. Further, $f_{12}-f_{11}$ and $f_{12}+f_{11}$ may be overlapped with the frequencies other than $f_{11}$, $f_{21}$, $f_{31}$ and $f_{12}$. $f_{22}-f_{21}$ and $f_{22}+f_{21}$ may be overlapped with the frequencies other than $f_{11}$, $f_{21}$, $f_{31}$ and $f_{22}$. $f_{32}-f_{31}$ and $f_{32}+f_{31}$ may be overlapped with the frequencies other than $f_{11}$, $f_{21}$, $f_{31}$ and $f_{32}$.

The respective light signals outputted from the optical transmission devices 2411, 2412 and 2413 enter the optical receiving device 2430 through the optical transmission line 2420. In the optical receiving device 2430, the light signal is converted into a current signal. The RF signal $e_2$ having any one of the frequencies $f_{11}$, $f_{21}$ and $f_{31}$ is extracted by a band-pass filter, to obtain a desired signal.

In the optical transmission device 2411, signals having frequencies such as $f_{12}$, $f_{12}-f_{11}$, and $f_{12}+f_{11}$ are inputted to a semiconductor laser in addition to the RF signal having the frequency $f_{11}$. Consequently, the spectrum distribution of the light signals outputted from the semiconductor laser is dispersed. The same is true for the optical transmission devices 2412 and 2413. According to the present embodiment, the light modulation factor of a signal to be transmitted need not be decreased, whereby the SN ratio of the signal after the receiving is not degraded.

Although in the present embodiment, the number of optical transmission devices is set to three, the number may be three or more. Further, although the number of RF signals in each of the optical transmission devices is set to two, the number may be two or more.

(Eleventh Embodiment)

The construction of an optical transmission system according to an eleventh embodiment of the present invention is the same as that in the above-mentioned tenth embodiment (see FIG. 24). The circuit configurations of respective optical transmission devices 2411 to 2413 is the same as that of the above-mentioned optical transmission device in the ninth embodiment (see FIG. 21). In the present embodiment, the number of RF signals used in each of the optical transmission devices 2411 to 2413 shall be two. Let $f_0$ and $f_{12}$ (where $f_0<f_{12}$) be the respective center frequencies of two RF signals $e_1$ and $e_2$ in the optical transmission device 2411, $f_0$ and $f_{22}$ (where $f_0<f_{22}$) be the respective center frequencies of two RF signals $e_1$ and $e_2$ in the optical transmission device 2412, and $f_0$ and $f_{32}$ (where $f_0<f_{32}$) be the respective center frequencies of two RF signals $e_1$ and $e_2$ in the optical transmission device 2413. Further, the respective RF signals $e_2$ shall include information to be sent by the optical transmission devices 2411, 2412 and 2413. In addition, the bands of the respective RF signals $e_2$ are respectively taken as $B_1$, $B_2$ and $B_3$, and the occupied frequencies thereof shall not be overlapped with each other.

Figure 26:
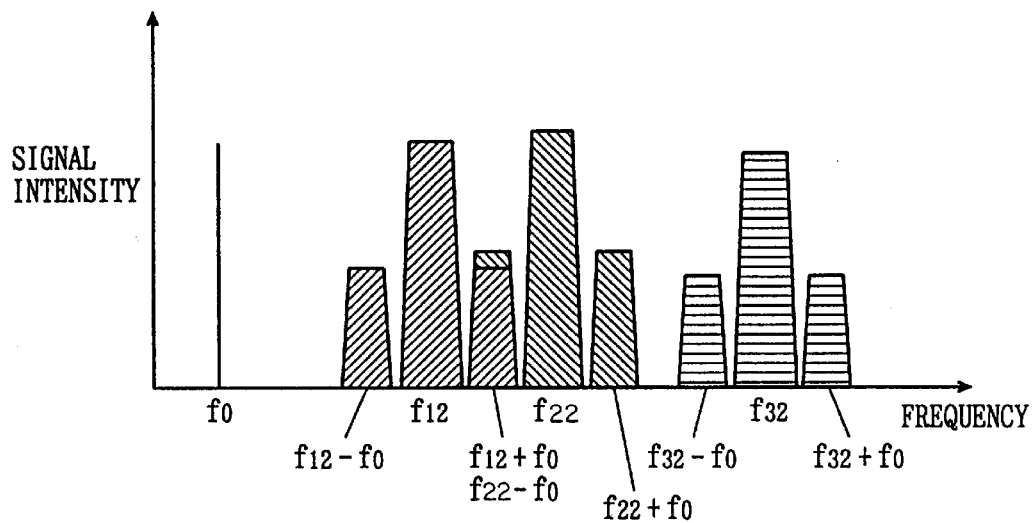
FIG. 26 is a diagram showing the spectrum distribution of an output signal in a principal part of the optical transmission system according to an eleventh embodiment of the present invention.

FIG. 26 illustrates the arrangement of the respective frequencies of light signals outputted from the optical transmission devices 2411, 2412 and 2413. The frequencies $f_0$, $f_{12}$, $f_{22}$ and $f_{32}$ shall satisfy the following conditional expressions (26), (27) and (28), where $f_{12}<f_{22}<f_{32}$, and k=1, 2, 3:

$$f_0 > B_K \quad (26)$$

$$|f_{22} - f_{12}| \geq 2 \cdot f_0 \quad (27)$$

$$|f_{32} - f_{22}| \geq 2 \cdot f_0 \quad (28)$$

The respective light signals outputted from the optical transmission devices 2411, 2412 and 2413 enter an optical receiving device 2430 through an optical transmission line 2420. In the optical receiving device 2430, the light signal is converted into a current signal. The RF signal $e_2$ having any one of the frequencies $f_{12}$, $f_{22}$ and $f_{32}$ is extracted by a band-pass filter, to obtain a desired signal. The effect obtained in the present embodiment is the same as that in the above-mentioned tenth embodiment.

(Twelfth Embodiment)

The construction of an optical transmission system according to a twelfth embodiment of the present invention is the same as that in the above-mentioned tenth embodiment (see FIG. 24). Further, the circuit configurations of optical transmission devices 2411 to 2413 are respectively the same as those of the above-mentioned optical transmission device in the ninth embodiment (see FIG. 21). In the present embodiment, the numbers of RF signals used in each of the optical transmission devices 2411 to 2413 shall be two. Let $f_0$ and $f_{12}$ (where $f_0 < f_{12}$) be the respective center frequencies of two RF signals $e_1$ and $e_2$ in the optical transmission device 2411, $f_0$ and $f_{22}$ (where $f_0 < f_{22}$) be the respective center frequencies of two RF signals $e_1$ and $e_2$ in the optical transmission device 2412, and $f_0$ and $f_{32}$ (where $f_0 < f_{32}$) be the respective center frequencies of two RF signals $e_1$ and $e_2$ in the optical transmission device 2413. Further, the RF signals $e_2$ shall respectively include information to be sent by the optical transmission devices 2411, 2412 and 2413. Let $f_{1a}$ and $f_{1b}$ be respectively the minimum frequency and the maximum frequency of the RF signal $e_2$ in the optical transmission device 2411, let $f_{2a}$ and $f_{2b}$ be respectively the minimum frequency and the maximum frequency of the RF signal $e_2$ in the optical transmission device 2412, and let $f_{3a}$ and $f_{3b}$ be respectively the minimum frequency and the maximum frequency of the RF signal $e_2$ in the optical transmission device 2413.

Figure 27:
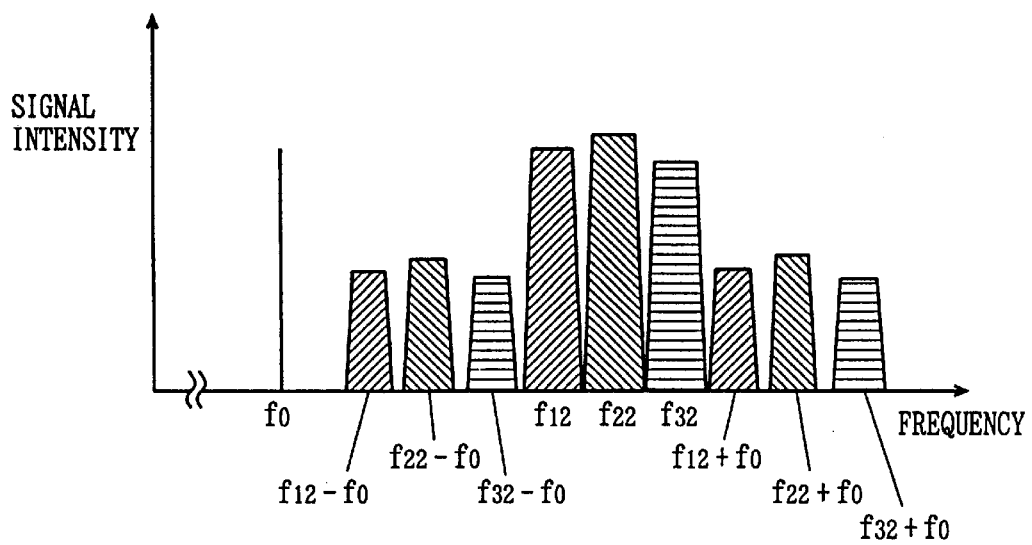
FIG. 27 is a diagram showing the spectrum distribution of an output signal in a principal part of the optical transmission system according to a twelfth embodiment of the present invention.

FIG. 27 illustrates the arrangement of the respective frequencies of light signals outputted from the optical transmission devices 2411, 2412 and 2413. The frequency $f_0$ shall satisfy the following conditional expression (29), where $f_{1a} < f_{1b} < f_{2a} < f_{2b} < f_{3a} < f_{3b}$:

$$f_0 > |f_{3b} - f_{1a}| \quad (29)$$

The respective light signals outputted from the optical transmission devices 2411, 2412 and 2413 enter an optical receiving device 2430 through an optical transmission line 2420. In the optical receiving device 2430, the light signal is converted into a current signal. The RF signal $e_2$ having any one of the frequencies $f_{12}$, $f_{22}$ and $f_{32}$ is extracted by a band-pass filter, to obtain a desired signal. An effect obtained in the present embodiment is the same as that in the above-mentioned tenth embodiment.

(Thirteenth Embodiment)

The construction of an optical transmission system according to a thirteenth embodiment of the present invention is the same as that in the above-mentioned tenth embodiment (see FIG. 24). The circuit configurations of optical transmission devices 2411 to 2413 are the same as those of the above-mentioned optical transmission device in the ninth embodiment (see FIG. 21). In the present embodiment, the numbers of RF signals used in each of the optical transmission devices 2411 to 2413 shall be two. Let $f_{11}$ and $f_0$ (where $f_{11} < f_0$) be the respective center frequencies of two RF signals $e_1$ and $e_2$ in the optical transmission device 2411, let $f_{21}$ and $f_0$ (where $f_{21} < f_0$) be the respective center frequencies of two RF signals $e_1$ and $e_2$ in the optical transmission device 2412, and let $f_{31}$ and $f_0$ (where $f_{31} < f_0$) be the respective center frequencies of two RF signals $e_1$ and $e_2$ in the optical transmission device 2413. Further, the RF signals $e_1$ shall respectively include information to be sent by the optical transmission devices 2411, 2412 and 2413. Let $f_{1a}$ and $f_{1b}$ be respectively the minimum frequency and the maximum frequency of the RF signal $e_1$ in the optical transmission device 2411, let $f_{2a}$ and $f_{2b}$ be respectively the minimum frequency and the maximum frequency of the RF signal $e_1$ in the optical transmission device 2412, and let $f_{3a}$ and $f_{3b}$ be respectively the minimum frequency and the maximum frequency of the RF signal $e_1$ in the optical transmission device 2413.

Figure 28:
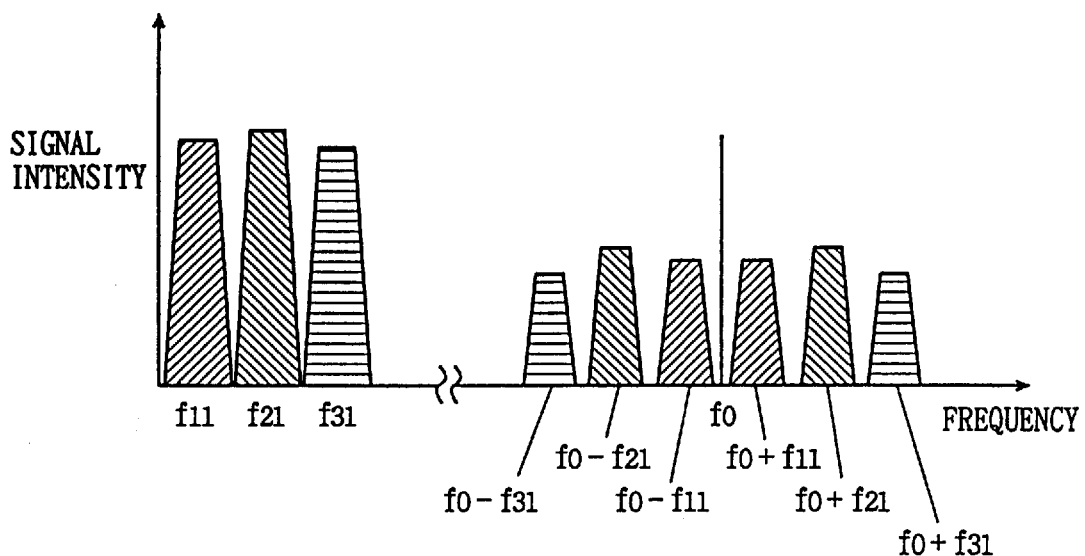
FIG. 28 is a diagram showing the spectrum distribution of an output signal in a principal part of an optical transmission system according to a thirteenth embodiment of the present invention.
Figure 29:
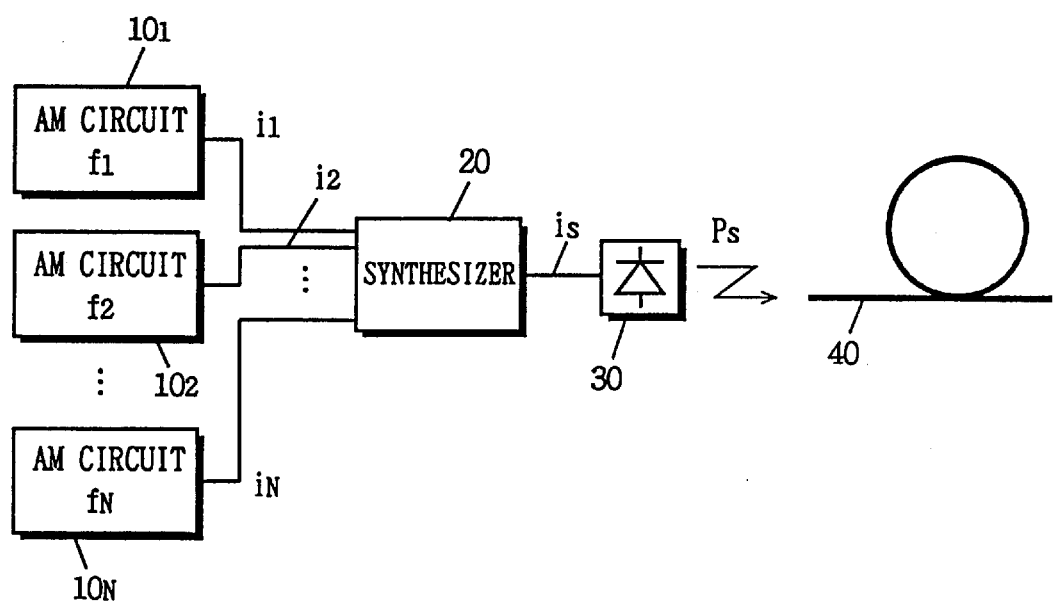
FIG. 29 is a block diagram showing one example of the construction of a conventional optical transmission system using an SCM transmission system.
Figure 30:
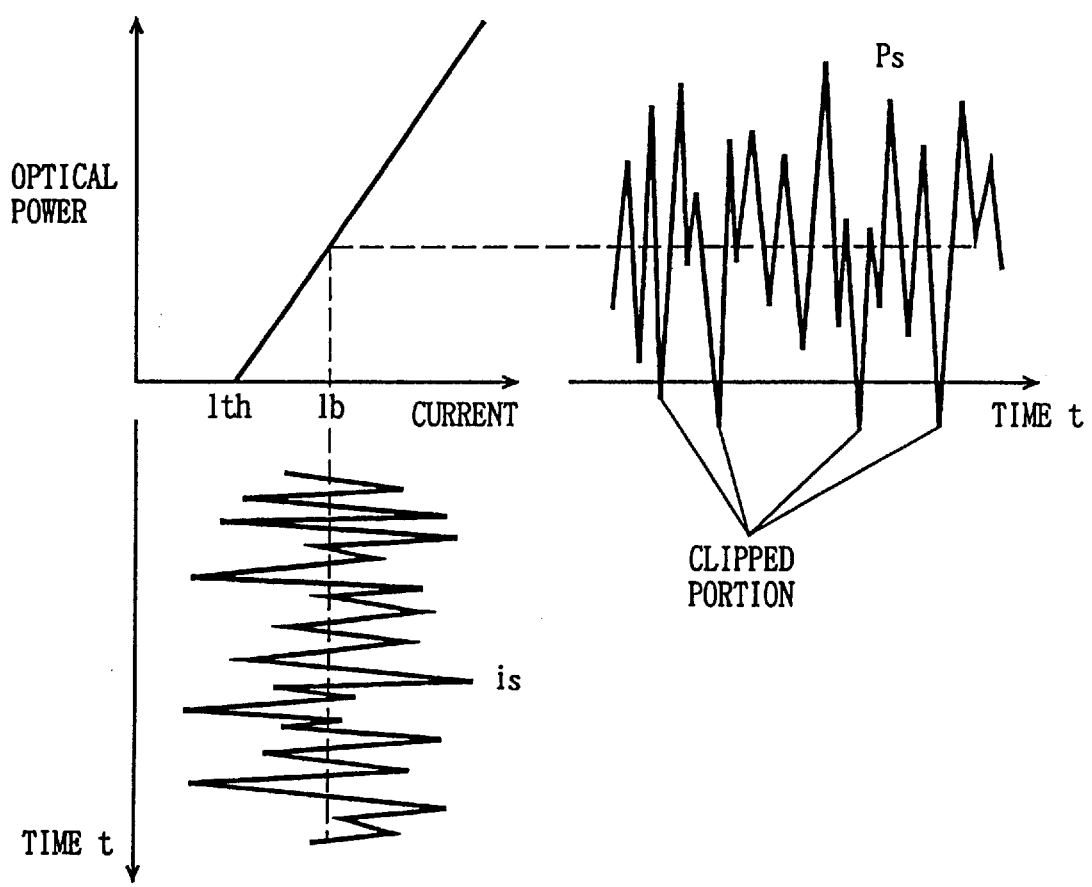
FIG. 30 is a diagram showing the principle of operations of the optical transmission system shown in FIG. 29.

FIG. 28 illustrates the arrangement of the respective frequencies of light signals outputted from the optical transmission devices 2411, 2412 and 2413. The frequency $f_0$ shall satisfy the following conditional expression (30), where $f_{1a} < f_{2a} < f_{2b} < f_{3a} < f_{3b}$:

$$f_0 > 2 \cdot f_{3b} \quad (30)$$

The respective light signals outputted from the optical transmission devices 2411, 2412 and 2413 enter an optical receiving device 2430 through an optical transmission line 2420. In the optical receiving device 2430, the light signal is converted into a current signal. The RF signal $e_1$ having any one of the frequencies $f_{11}$, $f_{21}$ and $f_{31}$ is extracted by a band-pass filter, to obtain a desired signal. An effect obtained in the present embodiment is the same as that in the above-mentioned tenth embodiment.

Although in the ninth embodiment (see FIG. 21), the multipliers 2112 to 211N are used for generating the cumulative signals $h_2$ to $h_N$, the multipliers may be replaced with the same circuits as the signal processing circuit 113 shown in FIG. 6. Further, also in the tenth to thirteenth embodiments, the multipliers in the respective optical transmission devices 2411 to 2413 may be replaced with the same circuits as the signal processing circuit 113 shown in FIG. 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical transmission system for multiplexing a plurality of optical modulation signals and for transmitting a multiplexed optical modulation signal through a common optical transmission line, said system comprising:

a plurality of optical transmission devices, each including a signal source for generating a transmission signal including information to be transmitted, said transmission signal having an envelope, wherein the envelope has a shape, a carrier generation circuit for generating a carrier signal, signal processing means for processing said carrier signal based on said transmission signal and for producing an electric modulation signal, said electric modulation signal being amplitude modulated by said transmission signal and having a high level envelope and a low level envelope, wherein one of said high level envelope and said low level envelope has a shape analogous to the shape of the envelope of said transmission signal and the other of said high level envelope and said low level envelope has an approximately constant level, and a light source element for converting said electric modulation signal into an optical modulation signal; wherein said carrier signal is angle-modulated by a particular signal.

2. An optical transmission system for multiplexing a plurality of optical modulation signals and for transmitting a multiplexed optical modulation signal through a common optical transmission line, said system comprising:

a plurality of optical transmission devices, each including a signal source for generating a transmission signal including information to be transmitted, said transmission signal having an envelope, wherein the envelope has a shape, a carrier generation circuit for generating a carrier signal, signal processing means for processing said carrier signal based on said transmission signal and for producing an electric modulation signal, said electric modulation signal being amplitude modulated by said transmission signal and having a high level envelope and a low level envelope, wherein one of said high level envelope and said low level envelope has a shape analogous to the shape of the envelope of said transmission signal and the other of said high level envelope and said low level envelope has an approximately constant level, and a light source element for converting said electric modulation signal into an optical modulation signal, wherein said signal processing means comprises amplitude modulation means for producing an output signal by amplitude modulating said carrier signal by said transmission signal, and clipping means for producing said electric modulation signal by clipping said output signal from said amplitude modulation means at a predetermined level.

3. An optical transmission system as claimed in claim 2 wherein each of said carrier generation circuits is operable to generate said carrier signal such that each of said carrier signals is a sine wave having a respective predetermined frequency.

4. An optical transmission system as claimed in claim 2 wherein each of said carrier generation circuits is operable to generate said carrier signal such that each of said carrier signals is a square wave.

5. An optical transmission system as claimed in claim 2 wherein each of said carrier generation circuits is operable to generate said carrier signal such that each of said carrier signals is angle-modulated by a respective particular signal.

6. An optical transmission system for multiplexing a plurality of optical modulation signals and for transmitting a multiplexed optical modulation signal through a common optical transmission line, said system comprising:

a plurality of optical transmission devices, each including a signal source for generating a transmission signal including information to be transmitted, said transmission signal having an envelope, wherein the envelope has a shape, a carrier generation circuit for generating a carrier signal, signal processing means for processing said carrier signal based on said transmission signal and for producing an electric modulation signal, said electric modulation signal having a high level envelope and a low level envelope, wherein one of said high level envelope and said low level envelope has a shape analogous to the shape of the envelope of said transmission signal and the other of said high level envelope and said low level envelope has an approximately constant level, and a light source element for converting said electric modulation signal into an optical modulation signal, wherein said signal processing means comprises a multiplier for producing said electric modulation signal by multiplying said transmission signal, which is offset by a first predetermined voltage, and said carrier signal, which is offset by a second predetermined voltage, together.

7. An optical transmission system as claimed in claim 6 wherein each of said carrier generation circuits is operable to generate said carrier signal such that each of said carrier signals is a sine wave having a respective predetermined frequency.

8. An optical transmission system as claimed in claim 6 wherein each of said carrier generation circuits is operable to generate said carrier signal such that each of said carrier signals is a square wave.

9. An optical transmission system as claimed in claim 6 wherein each of said carrier generation circuits is operable to generate said carrier signal such that each of said carrier signals is angle-modulated by a respective particular signal.

10. An optical transmission system for multiplexing a plurality of optical modulation signals and for transmitting a multiplexed optical modulation signal through a common optical transmission line, said system comprising:

a plurality of optical transmission devices, each including a signal source for generating a transmission signal including information to be transmitted, said transmission signal having an envelope, wherein the envelope has a shape, a carrier generation circuit for generating a carrier signal, signal processing means for processing said carrier signal based on said transmission signal and for producing an electric modulation signal, said electric modulation signal having a high level envelope and a low level envelope, wherein one of said high level envelope and said low level envelope has a shape analogous to the shape of the envelope of said transmission signal and the other of said high level envelope and said low level envelope has an approximately constant level, and a light source element for converting said electric modulation signal into an optical modulation signal, wherein said signal processing means comprises an adder for producing an output signal by adding said transmission signal and said carrier signal together, and clipping means for producing said electric modulation signal by clipping said output signal from said adder at a predetermined level.

11. An optical transmission system as claimed in claim 10 wherein each of said carrier generation circuits is operable to generate said carrier signal such that each of said carrier signals is a sine wave having a respective predetermined frequency.

12. An optical transmission system as claimed in claim 10 wherein each of said carrier generation circuits is operable to generate said carrier signal such that each of said carrier signals is a square wave.

13. An optical transmission system as claimed in claim 10 wherein each of said carrier generation circuits is operable to generate said carrier signal such that each of said carrier signals is angle-modulated by a respective particular signal.

14. An optical transmission system for multiplexing a plurality of optical modulation signals and for transmitting a multiplexed optical modulation signal through a common optical transmission line, said system comprising:

a plurality of optical transmission devices, each including
a signal source for generating a transmission signal including information to be transmitted, said transmission signal having an envelope, wherein the envelope has a shape,
a carrier generation circuit for generating a carrier signal,
signal processing means for processing said carrier signal based on said transmission signal and for producing an electric modulation signal, said electric modulation signal being amplitude modulated by said transmission signal and having a high level envelope and a low level envelope, wherein one of said high level envelope and said low level envelope has a shape analogous to the shape of the envelope of said transmission signal and the other of said high level envelope and said low level envelope has an approximately constant level, and
a light source element for converting said electric modulation signal into an optical modulation signal,
wherein said signal processor comprises an amplitude modulator for producing an output signal by amplitude modulating said carrier signal by said transmission signal, and an adder for producing said electric modulation signal by adding said output signal of said amplitude modulator and said transmission signal together.

15. An optical transmission system as claimed in claim 14 wherein each of said carrier generation circuits is operable to generate said carrier signal such that each of said carrier signals is a sine wave having a respective predetermined frequency.

16. An optical transmission system as claimed in claim 14 wherein each of said carrier generation circuits is operable to generate said carrier signal such that each of said carrier signals is a square wave.

17. An optical transmission system as claimed in claim 14 wherein each of said carrier generation circuits is operable to generate said carrier signal such that each of said carrier signals is angle-modulated by a respective particular signal.

18. An optical transmission system for multiplexing a plurality of optical modulation signals and for transmitting a multiplexed optical modulation signal through a common optical transmission line, said system comprising:

a plurality of optical transmission devices, each including
a signal source for generating a transmission signal including information to be transmitted, said transmission signal having an envelope, wherein the envelope has a shape,
a carrier generation circuit for generating a carrier signal,
signal processing means for processing said carrier signal based on said transmission signal and for producing an electric modulation signal, said electric modulation signal having a high level envelope and a low level envelope, wherein one of said high level envelope and said low level envelope has a shape analogous to the shape of the envelope of said transmission signal and the other of said high level envelope and said low level envelope has an approximately constant level, and
a light source element for converting said electric modulation signal into an optical modulation signal,
wherein said signal processing means comprises angle modulation means for producing an output signal by angle modulating said carrier signal by said transmission signal, an adder for producing an adder output signal by adding said output signal of said angle modulation means and said transmission signal together, and clipping means for producing said electric modulation signal by clipping said adder output signal at a predetermined level.

19. An optical transmission system as claimed in claim 18 wherein each of said carrier generation circuits is operable to generate said carrier signal such that each of said carrier signals is a sine wave having a respective predetermined frequency.

20. An optical transmission system as claimed in claim 18 wherein each of said carrier generation circuits is operable to generate said carrier signal such that each of said carrier signals is a square wave.

21. An optical transmission system as claimed in claim 18 wherein each of said carrier generation circuits is operable to generate said carrier signal such that each of said carrier signals is angle-modulated by a respective particular signal.

22. An optical transmission system for transmitting a plurality of transmission signals, occupying respectively different frequency bands, through a common optical transmission line, said system comprising:

a plurality of optical transmission devices, each including
a first conversion circuit for converting one of the plurality of transmission signals, including information to be transmitted, into a first light intensity modulation signal, wherein the one of the plurality of transmission signals has a maximum possible frequency, and
a second conversion circuit for converting said first light intensity modulation signal into a second light intensity modulation signal by intensity-modulating said first light intensity modulation signal by a pulse train having a basic frequency which is greater than or equal to twice the maximum possible frequency of the one of the plurality of transmission signals; and
a multiplexer for multiplexing said second light intensity modulation signals from each of said plurality of optical transmission devices so as to obtain a multiplexed light intensity signal and for transmitting said multiplexed light intensity signal through the common optical transmission line.

23. An optical transmission system as claimed in claim 22 wherein each of said first conversion circuits, included in a respective optical transmission device of said plurality of optical transmission devices, comprises a light emitting element for directly intensity modulating, by the respective one of the plurality of transmission signals, light generated by said light emitting element.

24. An optical transmission system as claimed in claim 22 wherein each of said first conversion circuits, included in a respective optical transmission device of said plurality of optical transmission devices, comprises:

a light emitting element for outputting light having a predetermined wavelength; and
an optical modulator for externally modulating, by the respective one of the plurality of transmission signals, the light outputted by said light emitting element.

25. An optical transmission system for transmitting a plurality of transmission signals, occupying respectively different frequency bands, through a common optical transmission line, said system comprising:

a plurality of optical transmission devices, each including a light emitting element for outputting light having a predetermined wavelength, means for generating a superimposed signal by superimposing a pulse train on one of the plurality of transmission signals, wherein the one of the plurality of transmission signals has a maximum possible frequency and includes information to be transmitted and said pulse train has a basic frequency which is greater than or equal to twice the maximum possible frequency of the one of the plurality of transmission signals, and an optical modulator for externally modulating, by said superimposed signal, the light outputted by said light emitting element; and a multiplexer for multiplexing said second light intensity modulation signals from each of said plurality of optical transmission devices so as to obtain a multiplexed light intensity signal and for transmitting said multiplexed light intensity signal through the common optical transmission line.

26. An optical transmission system for transmitting a plurality of transmission signals through a common optical transmission line, said system comprising:

a plurality of optical transmission devices, each including a modulation circuit for generating an electric modulation signal by modulating a sub-carrier by one of the plurality of transmission signals, wherein the one of the plurality of transmission signals has a maximum possible frequency and includes information to be transmitted, a first conversion circuit for converting said electric modulation signal into a first light intensity modulation signal, a second conversion circuit for converting said first light intensity modulation signal into a second light intensity modulation signal by intensity-modulating said first light intensity modulation signal by a pulse train having a basic frequency, wherein said basic frequency of said pulse train is greater than or equal to twice the maximum possible frequency of the one of the plurality of transmission signals; and a multiplexer for multiplexing said second light intensity modulation signals from each of said plurality of optical transmission devices so as to obtain a multiplexed light intensity signal and for transmitting said multiplexed light intensity signal through the common optical transmission line;

wherein each of the sub-carriers occupies a different frequency.

27. An optical transmission system for transmitting a plurality of transmission signals, occupying respectively different frequency bands, through a common optical transmission line, said system comprising:

a plurality of optical transmission devices, each including a first conversion circuit for converting one of the plurality of transmission signals into a first light intensity modulation signal, wherein the one of the plurality of transmission signals has a maximum possible frequency and includes information to be transmitted, a pulsed FM circuit for generating a pulse-shaped electric signal by pulsed frequency modulating a sub-carrier by a predetermined electric signal, wherein said sub-carrier has a frequency which is greater than or equal to twice the maximum possible frequency of the one of the plurality of transmission signals, a second conversion circuit for converting said first light intensity modulation signal into a second light intensity modulation signal by intensity-modulating said first light intensity modulation signal by said pulse-shaped electric signal; and a multiplexer for multiplexing said second light intensity modulation signals from each of said plurality of optical transmission devices so as to obtain a multiplexed light intensity signal and for transmitting said multiplexed light intensity signal through the common optical transmission line.

28. An optical transmission system as claimed in claim 27, wherein each of the sub-carriers occupies a different frequency.

29. An optical transmission system as claimed in claim 27, wherein each of the predetermined electric signals occupies a different frequency band.

30. An optical transmission system for transmitting a plurality of transmission signals through a common optical transmission line, said system comprising:

a plurality of optical transmission devices, each including a first conversion circuit for converting one of the plurality of transmission signals into a first light intensity modulation signal, wherein the one of the plurality of transmission signals has a maximum possible frequency and includes information to be transmitted, a second conversion circuit for converting said first light intensity modulation signal into a second light intensity modulation signal by intensity-modulating said first light intensity modulation signal by a pulse train having a basic frequency, wherein said basic frequency of said pulse train is greater than or equal to twice the maximum possible frequency of the one of the plurality of transmission signals; and a multiplexer for multiplexing said second light intensity modulation signals from each of said plurality of optical transmission devices so as to obtain a multiplexed light intensity signal and for transmitting said multiplexed light intensity signal through the common optical transmission line;

wherein said basic frequencies of said pulse trains of any two of said plurality of optical transmission devices are spaced from each other at a value larger than a sum of said maximum possible frequencies of respective transmission signals of said any two optical transmission devices.

31. An optical transmission system for transmitting a plurality of transmission signals, occupying respectively different frequency bands, through a common optical transmission line, said system comprising:

a plurality of optical transmission devices, each including a pulse light generation circuit for outputting a pulse-shaped light signal having a basic frequency, and a conversion circuit for generating a light intensity modulation signal by intensity modulating said pulse-shaped light signal by one of the plurality of transmission signals, wherein the one of the plurality of transmission signals has a maximum possible frequency and includes information to be transmitted and said basic frequency of said pulse-shaped light signal is greater than or equal to twice the maximum possible frequency of the one of the plurality of transmission signals; and a multiplexer for multiplexing said light intensity modulation signals from each of said plurality of optical transmission devices so as to obtain a multiplexed light intensity signal and for transmitting said multiplexed light intensity signal through the common optical transmission line.

32. An optical transmission system as claimed in claim 31 wherein each of said pulse light generation circuits, included in a respective optical transmission device of the plurality of transmission devices, comprises:

a pulse signal generation circuit for generating a pulse-shaped electric signal; and a light emitting element for directly intensity modulating, by said pulse-shaped electric signal, light generated by said light emitting element.

33. An optical transmission system as claimed in claim 31 wherein each of said pulse light generation circuits, included in a respective optical transmission device of the plurality of transmission devices, comprises:

a light emitting element for outputting light having a predetermined wavelength;

a pulse signal generation circuit for generating a pulse-shaped electric signal; and an optical modulator for externally modulating, by said pulse-shaped electric signal, the light outputted by said light emitting element.

34. An optical transmission system for transmitting a plurality of transmission signals, occupying respectively different frequency bands, through a common optical transmission line, said system comprising:

a plurality of optical transmission devices, each including
a light emitting element for outputting light having a predetermined wavelength,
a pulse signal generation circuit for generating a pulse-shaped electric signal,
means for generating a superimposed signal by superimposing said pulse-shaped electric signal on one of the plurality of transmission signals, wherein the one of the plurality of transmission signals includes information to be transmitted, and
an optical modulator for externally modulating, by said superimposed signal, the light outputted by said light emitting element; and a multiplexer for multiplexing said light intensity modulation signals from each of said plurality of optical transmission devices so as to obtain a multiplexed light intensity signal and for transmitting said multiplexed light intensity signal through the common optical transmission line.

35. An optical transmission device for converting an electric signal into a light signal and for transmitting the light signal, said optical transmission device comprising:

a plurality of element signal generation means, each for generating a respective direct current signal having a magnitude and a respective RF signal having an occupied frequency and for generating an element signal by adding said respective direct current signal to said respective RF signal, wherein said respective RF signal has a maximum amplitude value which is less than or equal to the magnitude of said direct current signal;

multiplication means for generating a cumulative signal by multiplying said element signals together; and optical modulation means for converting said cumulative signal into a light intensity modulation signal;

wherein said element signal generation means are operable such that the respective RF signals are generated such that the occupied frequencies of said respective RF signals do not overlap with each other and such that the occupied frequencies of said respective RF signals do not overlap with a frequency of higher harmonics produced by multiplying said RF signals together.

36. An optical transmission device as claimed in claim 35 wherein said element signal generation means are operable such that each of said respective RF signals is generated so as to include a plurality of modulation signals, each of said plurality of modulation signals has a different carrier frequency and a respective amplitude value, and each of said respective RF signals is generated such that a square root of a sum of squares of the amplitude values of said plurality of modulation signals is less than or equal to the magnitude of said respective direct current signal.

37. An optical transmission system for transmitting a plurality of transmission signals through a common optical transmission line, said system comprising:

a plurality of optical transmission devices, each including
a plurality of element signal generation means, each for generating a respective direct current signal having a magnitude and a respective RF signal having an occupied frequency and for generating an element signal by adding said respective direct current signal to said respective RF signal, wherein said respective RF signal has a maximum amplitude value which is less than or equal to the magnitude of said direct current signal;
multiplication means for generating a cumulative signal by multiplying said element signals together; and
optical modulation means for converting said cumulative signal into a light intensity modulation signal;
wherein said element signal generation means are operable such that the respective RF signals are generated such that the occupied frequencies of said respective RF signals do not overlap with each other and such that the occupied frequencies of said respective RF signals do not overlap with a frequency of higher harmonics produced by multiplying said RF signals together.

38. An optical transmission system as claimed in claim 37 wherein each of said element signal generation means in each of said optical transmission devices comprises:

first element signal generation means for generating a first respective direct current signal and a first RF signal having a frequency arranged on a low frequency side of a frequency spectrum, and for generating a first element signal by adding said first respective direct current signal to said first RF signal; and second element signal generation means for generating a second respective direct current signal and a second RF signal having a frequency bandwidth, including a maximum frequency value, and a center frequency arranged on a high frequency side of the frequency spectrum, and for generating a second element signal by adding said second respective direct current signal to said second RF signal;

wherein said first element signal generation means are operable such that said first RF signals are generated such that the frequencies of said first RF signals in all of said plurality of optical transmission devices have equal values and are larger than the maximum frequency value of the frequency bandwidths of said second RF signals in all of said plurality of optical transmission devices, and said second element signal generating means are operable such that said second RF signals are generated such that the center frequencies of said second RF signals in said plurality of optical transmission devices are spaced from each other by an amount which is greater than or equal to twice the value of the frequencies of said first RF signals.

39. An optical transmission system as claimed in claim 37 wherein each of said element signal generation means in each of said optical transmission devices comprises:

first element signal generation means for generating a first respective direct current signal and a first RF signal having a frequency arranged on a low frequency side of a frequency spectrum, and for generating a first element signal by adding said first respective direct current signal to said first RF signal; and second element signal generation means for generating a second respective direct current signal and a second RF signal having a frequency bandwidth, including a maximum frequency value and a minimum frequency value, and a center frequency arranged on a high frequency side of the frequency spectrum, and for generating a second element signal by adding said second respective direct current signal to said second RF signal;

wherein said first element signal generation means are operable such that said first RF signals are generated such that the frequencies of said first RF signals in all of said plurality of optical transmission devices have equal values and are larger than a difference between the maximum frequency value and the minimum frequency value of the frequency bandwidths of said second RF signals in all of said plurality of optical transmission devices.

40. An optical transmission system as claimed in claim 37 wherein each of said element signal generation means in each of said optical transmission devices comprises:

first element signal generation means for generating a first respective direct current signal and a first RF signal having a frequency arranged on a low frequency side of a frequency spectrum, and for generating a first element signal by adding said first respective direct current signal to said first RF signal; and second element signal generation means for generating a second respective direct current signal and a second RF signal having a frequency bandwidth and a center frequency arranged on a high frequency side of the frequency spectrum, and for generating a second element signal by adding said second respective direct current signal to said second RF signal;

wherein said first element signal generation means are operable such that said first RF signals are generated such that the frequencies of said first RF signals in said plurality of optical transmission devices differ in value from each other, said first RF signals including a maximum frequency RF signal, and said second element signal generating means are operable such that said second RF signals are generated such that the frequencies of said second RF signals in all of said plurality of optical transmission devices have equal values and such that the center frequencies of said second RF signals in said plurality of optical transmission devices are greater than or equal to twice said maximum frequency first RF signal.

* * * * *